United States Patent
Suzuki et al.

(10) Patent No.: US 7,460,628 B2
(45) Date of Patent: Dec. 2, 2008

(54) SYNCHRONOUS CLOCK GENERATION APPARATUS AND SYNCHRONOUS CLOCK GENERATION METHOD

(75) Inventors: Akihiro Suzuki, Osaka (JP); Hiroshi Sonobe, Mishima-gun (JP)

(73) Assignee: Panasonic Corporation, Osaka (JP)

( * ) Notice: Subject to any disclaimer, the term of this patent is extended or adjusted under 35 U.S.C. 154(b) by 595 days.

(21) Appl. No.: 11/012,192

(22) Filed: Dec. 16, 2004

(65) Prior Publication Data

US 2005/0135514 A1  Jun. 23, 2005

(30) Foreign Application Priority Data

Dec. 19, 2003  (JP)  ............... 2003-423396

(51) Int. Cl.
 *H04L 7/00* (2006.01)
(52) U.S. Cl. ............... 375/354; 327/291; 348/500
(58) Field of Classification Search ............... 375/345, 375/354; 455/136, 138; 348/540, 500, 537; 327/291
See application file for complete search history.

(56) References Cited

U.S. PATENT DOCUMENTS

| | | | | |
|---|---|---|---|---|
| 5,239,421 | A * | 8/1993 | Hamaguchi et al. | 386/48 |
| 6,683,926 | B2 * | 1/2004 | Zarubinsky et al. | 375/345 |
| 6,963,733 | B2 * | 11/2005 | Eriksson et al. | 455/132 |
| 6,970,526 | B2 * | 11/2005 | Min | 375/354 |
| 6,975,674 | B1 * | 12/2005 | Phanse et al. | 375/219 |
| 7,257,172 | B2 * | 8/2007 | Okamoto et al. | 375/341 |
| 2002/0047912 | A1 * | 4/2002 | Mabuchi et al. | 348/345 |
| 2002/0057750 | A1 * | 5/2002 | Nakao et al. | 375/345 |
| 2003/0123581 | A1 * | 7/2003 | Kim | 375/345 |
| 2003/0142768 | A1 * | 7/2003 | Sintonen | 375/345 |
| 2004/0037378 | A1 * | 2/2004 | Komori et al. | 375/345 |
| 2006/0239387 | A1 * | 10/2006 | Orihashi et al. | 375/345 |

FOREIGN PATENT DOCUMENTS

JP  2001-94821  4/2001

* cited by examiner

*Primary Examiner*—Jean B Corrielus
(74) *Attorney, Agent, or Firm*—Wenderoth, Lind & Ponack, L.L.P.

(57) ABSTRACT

A synchronous clock generation apparatus including a multiplier for multiplying a horizontal synchronizing signal by a horizontal synchronizing pulse signal to generate multiplication data, a gain variable digital LPF for extracting only DC components from the multiplication data and capable of performing gain adjustment, and a controller for calculating gain adjustment data, lock center frequency setting data, and LPF gain adjustment data based on the correction data. The controller detects an amount of deviation from the lock center frequency and an amount of variation, displaces the lock center frequency and shifts the lock range along the frequency axis to enlarge the apparent lock range when the amount of deviation is large, and reduces the gain to improve lock precision when the amount of variation is small, without expanding bits in the circuit configuration.

16 Claims, 17 Drawing Sheets

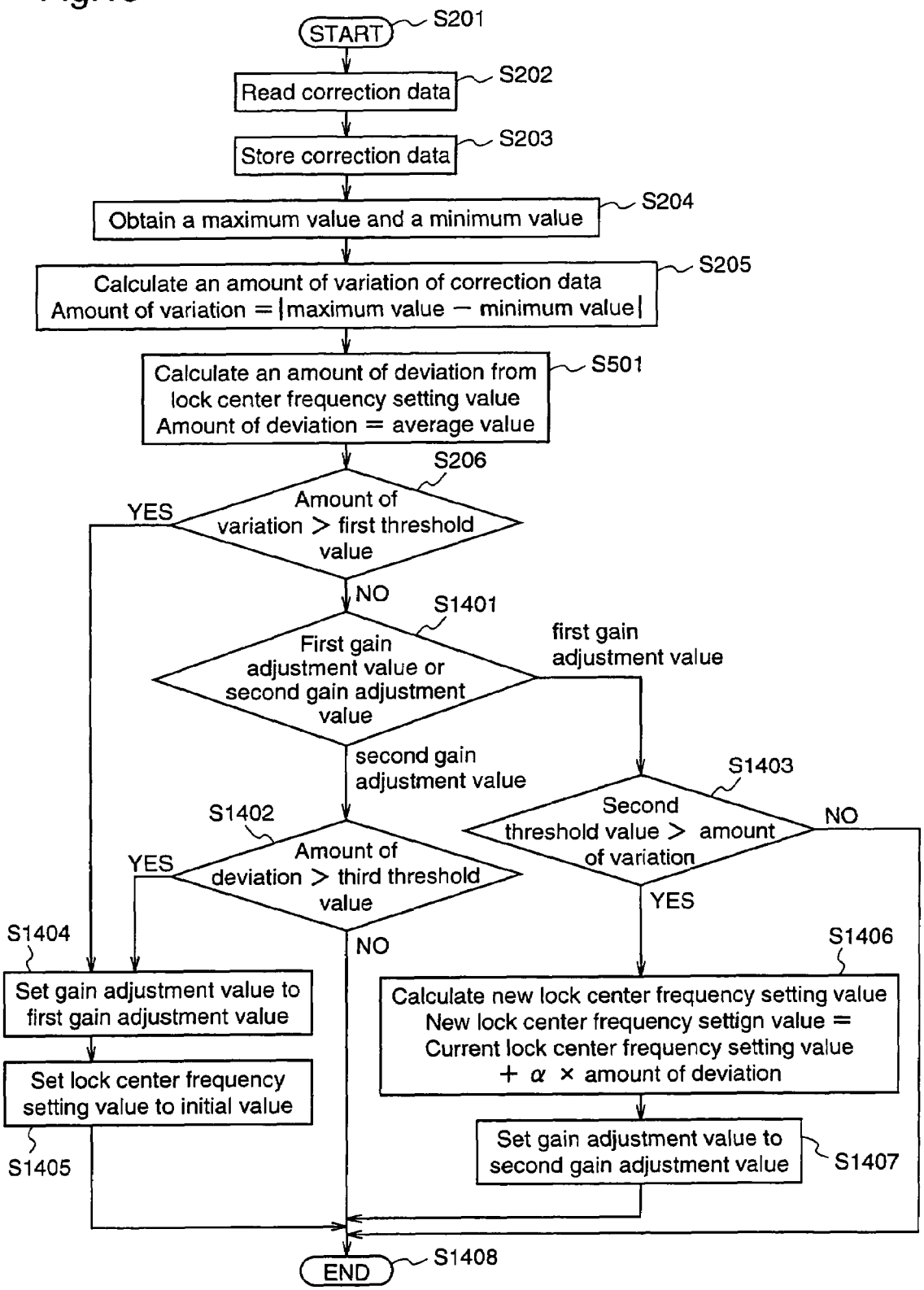

SYNCHRONOUS CLOCK GENERATION APPARATUS AND SYNCHRONOUS CLOCK GENERATION METHOD

BACKGROUND OF THE INVENTION

1. Field of the Invention

The present invention relates to a synchronous clock generation apparatus and synchronous clock generation method for generating a clock synchronized with an input signal. More specifically, the present invention relates to the synchronous clock generation apparatus and synchronous clock generation method for generating a clock synchronized with a horizontal synchronizing signal of a video signal.

2. Description of the Related Art

As a synchronous clock generation apparatus and synchronous clock generation method for generating a clock synchronized with an input signal, a horizontal synchronous clock generation apparatus for generating a clock synchronized with a horizontal synchronizing signal which is added to a video signal is disclosed in, for example, the Japanese Published Patent Application No. 2001-94821.

FIG. 12 is a block diagram illustrating a configuration of a sampling clock generation circuit suggested in the above-described Patent Document. In FIG. 12, an analog video signal S1201 to which a horizontal synchronizing signal is added is input to a video signal input terminal 1201. An A/D converter 1202 subjects the input analog video signal S1201 to digital conversion using a horizontal synchronous clock S1216 outputted from a multiplication circuit 1216 described later as a reference of sampling, and outputs a digital video signal S1202. A horizontal synchronization separator circuit 1203 separates a horizontal synchronizing signal from the digital video signal S1202 and outputs the separated horizontal synchronizing signal S1203. A pulse generation circuit 1204 counts the horizontal synchronous clocks S1216 outputted from the multiplication circuit 1216, described later, up to the number determined for each broadcast system for the input analog video signal S1201 to generate a horizontal synchronizing pulse signal S1204 and outputs the same. A multiplier 1205 multiplies the input horizontal synchronizing signal S1203 by the horizontal synchronizing pulse signal S1204 and outputs the result as multiplication data S1205. A digital LPF (low-pass filter) 1206 outputs, as correction data S1206, data which is obtained by eliminating high frequency components from the input multiplication data S1205 and extracting only DC (direct current) components.

The adder 1209 adds the correction data S1206 and a digital control signal S1218 which is supplied from a digital input terminal 1218 to output addition data S1209. Here, the digital control signal S1218 is data for determining a frequency of the horizontal synchronous clock outputted from the multiplication circuit 1216, described later, in a case where the correction data S1206 is not outputted from the digital LPF 1206, that is, a free-run frequency. An address generation circuit 1210 sequentially performs accumulation arithmetic of the input addition data S1209 to calculate an accumulated value. Here, the accumulated value is a value for which a carry-out signal is not used. Further, the address generation circuit 1210 outputs, as address data S1210, data which is obtained by dividing the accumulated value such that the accumulated value is adapted to an address of a SIN wave data table in the ROM (Read Only Memory) circuit 1211 described later. The frequency of the address data S1210 becomes faster as the addition data S1209 becomes larger, while the frequency of the address data S1210 becomes slower as the addition data S1209 becomes smaller. The ROM circuit 1211 holds a SIN wave data table, and when the address data S1210 is input, the ROM circuit 1211 refers to the SIN wave data which are held therein for each address and outputs a digital SIN wave signal S1211. A D/A converter 1212 converts the input digital SIN wave signal S1211 into an analog signal to output the converted signal as an analog SIN wave signal S1212. A multiplication circuit 1216 outputs, as a horizontal synchronous clock S1216, a clock signal which is obtained by performing an integral multiplication of a frequency of the input analog SIN wave signal S1212. The adder 1209, address generation circuit 1210, ROM circuit 1211, D/A converter 1212, and multiplication circuit 1216 constitute a VCO (voltage-controlled oscillator). The horizontal synchronous clock S1216 is supplied to each of the various external video signal processing units and supplied to the A/D converter 1202 and the pulse generation circuit 1204, as described above.

FIG. 13 is a diagram illustrating a clock frequency characteristic curve for explaining a performance of the sampling clock generation circuit disclosed in the above-described patent Document. In FIG. 13, the axis of abscissa indicates a desired clock frequency or a clock frequency which is primarily obtained when a clock frequency is completely synchronized with a horizontal synchronizing signal of a video signal, while the axis of ordinate indicates a generated clock frequency which is actually outputted from the multiplication circuit 1216 in the sampling clock generation circuit. The clock frequency characteristic curve S1321 indicates a relationship between the desired clock frequency and the generated clock frequency. The clock frequency characteristic curve S1321 is of step shape, and the desired clock frequencies consecutively change while the generated clock frequencies take non-consecutive values. The frequency lock range S1322 indicates a range of the generated clock frequencies which can be frequency-locked. The frequency lock precision S1323 is a precision of the generated clock frequency obtained with respect to the desired clock frequency, and here it is represented as a difference in frequency between the adjacent generated clock frequencies. When the frequency lock precision S1323 is high, that is, the difference in frequency between the adjacent generated clock frequencies is small, the generated clock frequency can be frequency-locked to the generated clock frequency close to the desired clock frequency with higher precision. The frequency S1324 is a generated clock frequency in the case of no correction data S1206 being supplied from the digital LPF 1206.

As shown in FIG. 13, when the desired clock frequency is F1301, the generated clock frequency is F1302. Further, when the desired clock frequency is F1303, the generated clock frequency is F1304. Further, when the desired clock frequency is F1307, the generated clock frequency is F1308. Moreover, when the desired clock frequency is F1305, the generated clock frequency is F1306.

Here, the frequency lock range S1322 depends on the gain of the digital LPF 1206. That is, when the gain of the digital LPF 1206 is larger, the variation in frequency of the address generation circuit 1210 becomes wider, and thereby the variation in generated clock frequency becomes wider and the frequency lock range S1322 becomes wider.

Further, the frequency lock precision S1323 depends on the number of bits of the correction data S1206 which is an output from the digital LPF 1206 and a gain of the digital LPF 1206. That is, as the number of bits of the correction data S1206, which is an output from the digital LPF 1206, is larger, the number of steps which the generated clock frequencies can take within the frequency lock range S1322 is larger, and thereby the frequency lock precision is made higher. On the other hand, when the number of bits of the correction data S1206 which is an output from the digital LPF 1206 is constant and the number of steps which the generated clock frequencies can take within the frequency lock range S1322 is constant, as the gain of the digital LPF 1206 becomes larger, the frequency lock range becomes wider, and thereby the frequency lock precision is made lower.

However, in the prior art sampling clock generation circuit, as disclosed in the above Patent Document, for example, as shown in FIG. 13, when the desired clock frequency is between F1303 and F1307, the obtained generated clock frequency is either F1304 or F1308 which are frequencies different from each other by the frequency lock precision, and the generated clock frequency cannot take the intermediate value. That is, the generated clock frequency cannot be obtained with precision higher than the frequency lock precision. The frequency lock precision is set on the basis of the number of output bits and gain of the digital LPF 1206, and these values are determined depending on the circuit configuration of the digital LPF 1206, and cannot be easily changed during the operation. Accordingly, there is a problem that the sampling clock generation circuit disclosed in the above-described Patent Document can generate only the generated clock frequency which is dependent upon the frequency lock precision which is determined by the circuit configuration.

In addition, as shown in FIG. 13, when the desired clock frequency is a frequency F1305 which is higher than the generated clock frequency F1306, which is an upper limit of the frequency lock range, the generated clock frequency which is obtained by the horizontal synchronous clock generation apparatus is locked to F1306. That is, the generated clock frequency cannot be a frequency outside the frequency lock range, and therefore when the desired clock frequency is a frequency higher than the generated clock frequency, which is an upper limit of the frequency lock range, the generated clock frequency is locked to a generated clock frequency, which is an upper limit of the frequency lock range. The frequency lock range is set depending on the gain of the digital LPF 1206, and the value of the gain is determined depending on the circuit configuration of the digital LPF 1206, and cannot be easily changed during the operation. Accordingly, there is a problem that in the sampling clock generation circuit disclosed in the above-described Patent Document, when the desired clock frequency is a frequency outside the frequency lock range, the generated clock frequency cannot trace the desired clock frequency, thereby generating only the generated clock frequencies which are dependent upon the frequency lock range.

Then, it can be assumed that the above-described problem is solved by expanding bits of data outputted from the digital LPF 1206. However, in this case, there is a drawback that the circuit scale is substantially increased.

BRIEF SUMMARY OF THE INVENTION

The present invention is made to solve the above-described problems and has for its object to provide a synchronous clock generation apparatus which can improve a frequency lock precision and enlarge a frequency lock range according to an input signal to which a synchronizing signal is added without expanding bits of data which are processed in the synchronous clock generation apparatus, and provide a synchronous clock generation method.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided a synchronous clock generation apparatus comprising: an A/D converter for converting an analog input signal, to which a synchronizing signal is added, into a digital signal using a synchronous clock, synchronized with the synchronizing signal, as a reference of sampling; a synchronizing signal separator circuit for separating the synchronizing signal from the digital signal; a pulse generation circuit for counting synchronous clocks up to a number which is previously set for the analog input signal to generate a synchronizing pulse signal; a multiplier for multiplying the synchronizing signal separated by the synchronizing signal separator circuit by the synchronizing pulse signal and outputting the multiplication data; a low-pass filter for extracting a direct current component from the multiplication data and outputting the direct current component as correction data; a controller for setting a gain adjustment value for gain adjustment which is performed on the correction data, on the basis of the correction data, and outputting gain adjustment data indicating the gain adjustment value; a gain adjustment circuit for performing gain adjustment on the correction data on the basis of the gain adjustment data; and a voltage-controlled oscillator for generating a clock of a frequency according to the gain-adjusted correction data which is output from the gain adjustment circuit and outputting the clock as the synchronous clock. Therefore, a gain adjustment value is set according to an input signal to which a synchronizing signal is added, and thereby a frequency lock precision can be improved without expanding bits of data which is processed in the apparatus.

According to a 2nd aspect of the present invention, in the synchronous clock generation apparatus of the 1st aspect, the controller captures the correction data outputted from the low-pass filter and stores a predetermined number of correction data counting from the latest correction data from among the captured correction data, subtracts a minimum value of the stored correction data from a maximum value thereof to calculate an amount of variation, and compares the amount of variation with a predetermined first threshold value and with a second threshold value smaller than the first threshold value, and sets the gain adjustment value to a value larger than the current value when the amount of variation is larger than the first threshold value, and sets the gain adjustment value to a value smaller than the current value when the amount of variation is smaller than the second threshold value, without changing the gain adjustment value when the amount of variation is equal to or smaller than the first threshold value and it is equal to or larger than the second threshold value. Therefore, a gain adjustment value is set according to an input signal to which a synchronizing signal is added, and thereby a frequency lock precision can be improved without expanding bits of data which is processed in the apparatus.

According to a 3rd aspect of the present invention, in the synchronous clock generation apparatus of the 1st aspect, the controller sets a lock center frequency setting value for setting a frequency of the synchronous clock which is obtained in a state where the correction data is not outputted, on the basis of the correction data, and outputs lock center frequency setting data indicating the lock center frequency setting value, and the voltage-controlled oscillator generates a clock of a frequency according to data obtained by adding the correction data outputted from the gain adjustment circuit and the lock center frequency setting data. Therefore, a gain adjustment value is set according to an input signal to which a synchronizing signal is added and thereby a frequency lock precision can be improved without expanding bits of data which is processed in the apparatus, and a lock center frequency is set according to an input signal to which a synchronizing signal is added, and thereby a frequency lock range can be enlarged.

According to a 4th aspect of the present invention, in the synchronous clock generation apparatus of the 3rd aspect, the controller captures the correction data outputted from the low-pass filter and stores a predetermined number of correction data counting from the latest correction data from among the captured correction data, calculates an average value of the stored correction data to calculate an amount of deviation of the correction data from the lock center frequency setting value, compares the amount of deviation with a predetermined third threshold value, and sets the lock center frequency setting value to a value corrected according to the amount of deviation when the amount of deviation is larger than the third threshold value, without changing the lock center frequency setting value when the amount of deviation is equal to or smaller than the third threshold value, subtracts the minimum value of the stored correction data from the maximum value thereof to calculate the amount of variation, and compares the amount of variation with a predetermined first threshold value and with a second threshold value smaller than the first threshold value, and sets the gain adjustment value to a value larger than the current value when the amount of variation is larger than the first threshold value, and sets the gain adjustment value to a value smaller than the current value when the amount of variation is equal to or smaller than the first threshold value and it is smaller than the second threshold value, without changing the gain adjustment value when the amount of variation is equal to or smaller than the first threshold value and it is equal to or larger than the second threshold value. Therefore, a gain adjustment value is set according to an input signal to which a synchronizing signal is added and thereby a frequency lock precision can be improved, without expanding bits of data which is processed in the apparatus, and a lock center frequency is set according to an input signal to which a synchronizing signal is added, and thereby a frequency lock range can be enlarged.

According to a 5th aspect of the present invention, in the synchronous clock generation apparatus of the 3rd aspect, the controller captures the correction data outputted from the low-pass filter and stores a predetermined number of correction data counting from the latest correction data from among the captured correction data, subtracts a minimum value of the stored correction data from a maximum value thereof to calculate an amount of variation, calculates an average value of the stored correction data to calculate an amount of deviation of the correction data from the lock center frequency setting value, compares the amount of variation with a predetermined first threshold value, and judges whether the current gain adjustment value is a first gain adjustment value or a second gain adjustment value smaller than the first gain adjustment value when the amount of variation is equal to or smaller than the first threshold value as a result of the comparison, compares the amount of variation with a predetermined second threshold value smaller than the first threshold value when it is judged as a result of the judgment that the current gain adjustment value is the first gain adjustment value, and sets the lock center frequency setting value to a value corrected according to the amount of deviation and sets the gain adjustment value to the second gain adjustment value when the amount of variation is smaller than the second threshold value, without changing the gain adjustment value and the lock center frequency setting value when the amount of variation is equal to or smaller than the second threshold value, compares the amount of deviation with a predetermined third threshold value when it is judged that the current gain adjustment value is the second gain adjustment value as a result of judgment as to the current gain adjustment value, and sets the gain adjustment value to the first gain adjustment value and sets the lock center frequency setting value to an initial value which is set according to the analog input signal when it is judged that the amount of variation is larger than the third threshold value, without changing the gain adjustment value and the lock center frequency setting value when it is judged that the amount of deviation is equal to or smaller than the third threshold value, and sets the gain adjustment value to the first gain adjustment value and sets the lock center frequency setting value to an initial value which is set according to the analog input signal when it is judged that the amount of variation is larger than the first threshold value as a result of comparison as to the amount of variation. Therefore, a gain adjustment value is set according to an input signal to which a synchronizing signal is added and thereby a frequency lock precision can be improved without expanding bits of data which is processed in the apparatus, and a lock center frequency is set according to an input signal to which a synchronizing signal is added, and thereby a frequency lock range can be enlarged.

According to a 6th aspect of the present invention, in the synchronous clock generation apparatus of the 1st aspect, the low-pass filter performs gain adjustment for a high frequency component, and the controller sets low-pass filter gain adjustment data for controlling a low-pass filter gain adjustment value for the high frequency component of the low-pass filter on the basis of the correction data outputted from the low-pass filter and outputs the low-pass filter gain adjustment data to the gain adjustment circuit. Therefore, a gain adjustment value is set according to an input signal to which a synchronizing signal is added and thereby a frequency lock precision can be improved without expanding bits of data which is processed in the apparatus, and gain adjustment can be performed for the high frequency component of a low-pass filter according to an input signal to which a synchronizing signal is added, and thereby lock response speed can be improved and generated synchronous clock can be stabilized.

According to a 7th aspect of the present invention, in the synchronous clock generation apparatus of the 6th aspect, the controller captures the correction data outputted from the low-pass filter and stores a predetermined number of correction data counting from the latest correction data from among the captured correction data, subtracts a minimum value of the stored correction data from a maximum value thereof to calculate an amount of variation, and compares the amount of variation with a predetermined first threshold value and with a second threshold value smaller than the first threshold value, and sets the low-pass filter gain adjustment value to a value larger than the current value when the amount of variation is larger than the first threshold value, and sets the low-pass filter gain adjustment value to a value smaller than the current value when the amount of variation is smaller than the second threshold value, without changing the low-pass filter gain adjustment value when the amount of variation is equal to or smaller than the first threshold value and it is equal to or larger than the second threshold value. Therefore, a gain adjustment value is set according to an input signal to which a synchronizing signal is added and thereby a frequency lock precision can be improved without expanding bits of data which is processed in the apparatus, and gain adjustment can be performed for the high frequency component of a low-pass filter according to an input signal to which a synchronizing signal is added, and thereby lock response speed can be improved and generated synchronous clock can be stabilized.

According to an 8th aspect of the present invention, in the synchronous clock generation apparatus of the 1st aspect, the voltage-controlled oscillator comprises: an adder for generating addition data obtained by adding the gain-adjusted correction data and data indicating a lock center frequency setting value for setting a frequency of the synchronous clock which is obtained in a state where the correction data is not outputted; an address generation circuit for performing accumulation arithmetic of the addition data and generating address data whose frequency becomes higher as the addition data becomes larger and whose frequency becomes lower as the addition data becomes smaller on the basis of the accumulated value; a memory circuit for referring to SIN wave data which is stored therein for each address and generating a digital SIN wave signal according to the address data; a D/A converter for converting the digital SIN wave signal into an analog SIN wave signal; an analog low-pass filter for eliminating a digital noise of the analog SIN wave signal; and a multiplication circuit for performing an integral multiplication of a frequency of the analog SIN wave signal from which the digital noise is eliminated, to generate the synchronous clock. Therefore, a gain adjustment value is set according to an input signal to which a synchronizing signal is added, and thereby a frequency lock precision can be improved without expanding bits of data which is processed in the apparatus.

According to a 9th aspect of the present invention, in the synchronous clock generation apparatus of the 1st aspect, the analog input signal is a video signal, and the synchronizing signal is a horizontal synchronizing signal. Therefore, a gain adjustment value is set according to an input signal to which a synchronizing signal is added, and thereby a frequency lock precision can be improved without expanding bits of data which is processed in the apparatus. Further, a lock range for generating a horizontal synchronous clock synchronized with a horizontal synchronizing signal which is added to a video signal is enlarged and thereby a lock range of the horizontal synchronous clock which is a driving clock which is supplied for video signal processing is enlarged, thereby enlarging non-standard corresponding width for video display.

According to a 10th aspect of the present invention, in the synchronous clock generation apparatus of the 9th aspect, a vertical synchronizing signal is added to the video signal, said synchronous clock generation apparatus further includes a vertical synchronizing signal separator circuit for separating the vertical synchronizing signal from the digital signal which is converted by the A/D converter, and the controller uses the vertical synchronizing signal as a start signal for processing. Therefore, a gain adjustment value is set according to an input signal to which a synchronizing signal is added, and thereby a frequency lock precision can be improved without expanding bits of data which is processed in the apparatus.

According to an 11th aspect of the present invention, there is provided a synchronous clock generation apparatus comprising: an A/D converter for converting an analog input signal, to which a synchronizing signal is added, into a digital signal using a synchronous clock, synchronized with the synchronizing signal, as a reference of sampling; a synchronizing signal separator circuit for separating the synchronizing signal from the digital signal; a pulse generation circuit for counting synchronous clocks up to a number which is previously set for the analog input signal to generate a synchronizing pulse signal; a multiplier for multiplying the synchronizing signal separated by the synchronizing signal separator circuit by the synchronizing pulse signal and outputting the multiplication data; a low-pass filter for extracting a direct current component from the multiplication data and outputting the direct current component as correction data; a controller for setting a lock center frequency setting value for setting a frequency of the synchronous clock which is obtained in a state where the correction data is not outputted, on the basis of the correction data, and outputting lock center frequency setting data indicating the lock center frequency setting value; and a voltage-controlled oscillator for generating a clock of a frequency according to data obtained by adding the correction data and the lock center frequency setting data and outputting the clock as the synchronous clock. Therefore, a lock center frequency is set according to an input signal to which a synchronizing signal is added, thereby enlarging a frequency lock range.

According to a 12th aspect of the present invention, in the synchronous clock generation apparatus of the 11th aspect, the controller captures the correction data outputted from the low-pass filter and stores a predetermined number of correction data counting from the latest correction data from among the captured correction data, calculates an average value of the stored correction data to calculate an amount of deviation of the correction data from the lock center frequency setting value, and compares the amount of deviation with a predetermined threshold value, and sets the lock center frequency setting value to a value corrected according to the amount of deviation when the amount of deviation is larger than the threshold value, without changing the lock center frequency setting value when the amount of deviation is equal to or smaller than the threshold value. Therefore, a lock center frequency is set according to an input signal to which a synchronizing signal is added, thereby enlarging a frequency lock range.

According to a 13th aspect of the present invention, in the synchronous clock generation apparatus of the 11th aspect, the low-pass filter performs gain adjustment for a high frequency component, and the controller sets low-pass filter gain adjustment data for controlling a low-pass filter gain adjustment value for the high frequency component of the low-pass filter on the basis of the correction data outputted from the low-pass filter and outputs the low-pass filter gain adjustment data to the gain adjustment circuit. Therefore, a lock center frequency is set according to an input signal to which a synchronizing signal is added and thereby a frequency lock range can be enlarged, and gain adjustment can be performed for the high frequency component of a low-pass filter according to an input signal to which a synchronizing signal is added, thereby improving a lock response speed and stabilizing the generated synchronous clock.

According to a 14th aspect of the present invention, in the synchronous clock generation apparatus of the 13th aspect, the controller captures the correction data outputted from the low-pass filter and stores a predetermined number of correction data counting from the latest correction data from among the captured correction data, subtracts a minimum value of the stored correction data from a maximum value thereof to calculate an amount of variation, and compares the amount of variation with a predetermined first threshold value and with a second threshold value smaller than the first threshold value, and sets the low-pass filter gain adjustment value to a value larger than the current value when the amount of variation is larger than the first threshold value, and sets the low-pass filter gain adjustment value to a value smaller than the current value when the amount of variation is smaller than the second threshold value, without changing the low-pass filter gain adjustment value when the amount of variation is equal to or smaller than the first threshold value and it is equal to or larger than the second threshold value. Therefore, a lock center frequency is set according to an input signal to which a synchronizing signal is added and thereby a frequency lock range can be enlarged, and gain adjustment can be performed for the high frequency component of a low-pass filter according to an input signal to which a synchronizing signal is added, thereby improving a lock response speed and stabilizing the generated synchronous clock.

According to a 15th aspect of the present invention, in the synchronous clock generation apparatus of the 11th aspect, the voltage-controlled oscillator comprises: an adder for generating addition data obtained by adding the gain-adjusted correction data and the lock center frequency setting data; an address generation circuit for performing accumulation arithmetic of the addition data and generating address data whose frequency becomes higher as the addition data becomes larger and whose frequency becomes lower as the addition data becomes smaller on the basis of the accumulated value; a memory circuit for referring to SIN wave data which is stored therein for each address and generating a digital SIN wave signal according to the address data; a D/A converter for converting the digital SIN wave signal into an analog SIN wave signal; an analog low-pass filter for eliminating a digital noise of the analog SIN wave signal; and a multiplication circuit for performing an integral multiplication of a frequency of the analog SIN wave signal from which the digital noise is eliminated, to generate the synchronous clock. Therefore, a lock center frequency is set according to an input signal to which a synchronizing signal is added, thereby enlarging a frequency lock range.

According to a 16th aspect of the present invention, in the synchronous clock generation apparatus of the 11th aspect, the analog input signal is a video signal, and the synchronizing signal is a horizontal synchronizing signal. Therefore, a lock center frequency is set according to an input signal to which a synchronizing signal is added, thereby enlarging a frequency lock range. Further, a lock range for generating a horizontal synchronous clock synchronized with a horizontal synchronizing signal which is added to a video signal is enlarged and thereby a lock range of the horizontal synchronous clock which is a driving clock which is supplied for video signal processing is enlarged, thereby enlarging nonstandard corresponding width for video display.

According to a 17th aspect of the present invention, in the synchronous clock generation apparatus of the 16th aspect, a vertical synchronizing signal is added to the video signal, said synchronous clock generation apparatus further includes a vertical synchronizing signal separator circuit for separating the vertical synchronizing signal from the digital signal which is converted by the A/D converter, and the controller uses the vertical synchronizing signal as a start signal for processing. Therefore, a lock center frequency is set according to an input signal to which a synchronizing signal is added, thereby enlarging a frequency lock range.

According to an 18th aspect of the present invention, there is provided a synchronous clock generation apparatus comprising: an A/D converter for converting an analog input signal, to which a synchronizing signal is added, into a digital signal using a synchronous clock, synchronized with the synchronizing signal, as a reference of sampling; a synchronizing signal separator circuit for separating the synchronizing signal from the digital signal; a pulse generation circuit for counting synchronous clocks up to a number which is previously set for the analog input signal to generate a synchronizing pulse signal; a multiplier for multiplying the synchronizing signal separated by the synchronizing signal separator circuit by the synchronizing pulse signal and outputting the multiplication data; a low-pass filter for extracting a direct current component from the multiplication data and outputting the direct current component as correction data; a gain adjustment circuit for performing gain adjustment on the correction data on the basis of gain adjustment data; a voltage-controlled oscillator for generating a clock of a frequency according to data obtained by adding the correction data obtained from the gain adjustment circuit and lock center frequency setting data for setting a lock center frequency setting value for setting a frequency of the synchronous clock obtained in a state where the correction data is not outputted, thereby to generate a clock synchronized with the synchronizing signal and outputting the clock as the synchronous clock; a correction data storage circuit for receiving the synchronizing pulse signal as a load pulse, capturing the correction data outputted from the low-pass filter, and storing a predetermined number of correction data counting from the latest correction data from among the captured correction data; a variation amount calculation circuit for subtracting a minimum value of the correction data stored by the correction data storage circuit from a maximum value thereof to calculate an amount of variation; a variation amount comparison circuit for comparing the amount of variation with a predetermined first threshold value and with a second threshold value smaller than the first threshold value and outputting a variation amount comparison result; a gain adjustment value determination circuit for setting a gain adjustment value of gain adjustment performed on the correction data on the basis of the variation amount comparison result and outputting data indicating the gain adjustment value as the gain adjustment data; a deviation amount calculation circuit for calculating an average value of the correction data stored in the correction data storage circuit to calculate an amount of deviation of the correction data from the lock center frequency setting value; a deviation amount comparison circuit for comparing the amount of deviation with a predetermined third threshold value and outputting the deviation amount comparison result; and a lock center frequency setting value calculation circuit for setting a lock center frequency setting value on the basis of the amount of deviation and the deviation amount comparison result, and outputting data indicating the lock center frequency setting value as the lock center frequency setting data. Therefore, a gain adjustment value is set according to an input signal to which a synchronizing signal is added and thereby a frequency lock precision can be improved without expanding bits of data which is processed in the apparatus, and a lock center frequency is set according to an input signal to which a synchronizing signal is added, and thereby a frequency lock range can be enlarged.

According to a 19th aspect of the present invention, in the synchronous clock generation apparatus of the 18th aspect, the low-pass filter performs gain adjustment for a high frequency component, and the gain adjustment value determination circuit sets low-pass filter gain adjustment data for controlling a low-pass filter gain adjustment value for the high frequency component of the low-pass filter on the basis of the variation amount comparison result and outputs the low-pass filter gain adjustment data to the low-pass filter. Therefore, a gain adjustment value is set according to an input signal to which a synchronizing signal is added and thereby a frequency lock precision can be improved without expanding bits of data which is processed in the apparatus, and a lock center frequency is set according to an input signal to which a synchronizing signal is added and thereby a frequency lock range can be enlarged, and further, gain adjustment can be performed for the high frequency component of a low-pass filter according to an input signal to which a synchronizing signal is added, and thereby lock response speed can be improved and generated synchronous clock can be stabilized.

According to a 20th aspect of the present invention, there is provided a synchronous clock generation method comprising the steps of: converting an analog input signal, to which a synchronizing signal is added, into a digital signal using a synchronous clock, synchronized with the synchronizing signal, as a reference of sampling; separating the synchronizing signal from the digital signal; counting synchronous clocks up to a number which is previously set for the analog input signal to generate a synchronizing pulse signal; multiplying the synchronizing signal separated from the digital signal by the synchronizing pulse signal and outputting the multiplication data; extracting a direct current component from the multiplication data, thereby to generate correction data; setting a gain adjustment value for gain adjustment which is performed on the correction data, on the basis of the correction data, and outputting gain adjustment data indicating the gain adjustment value; performing gain adjustment on the correction data on the basis of the gain adjustment data; and generating a clock of a frequency according to the gain-adjusted correction data which is outputted from the gain adjustment circuit and outputting the clock as the synchronous clock. Therefore, a gain adjustment value is set according to an input signal to which a synchronizing signal is added, and thereby a frequency lock precision can be improved without expanding bits of processed data.

According to a 21st aspect of the present invention, there is provided a synchronous clock generation method comprising the steps of: converting an analog input signal, to which a synchronizing signal is added, into a digital signal using a synchronous clock, synchronized with the synchronizing signal, as a reference of sampling; separating the synchronizing signal from the digital signal; counting synchronous clocks up to a number which is previously set for the analog input signal to generate a synchronizing pulse signal; multiplying the synchronizing signal separated from the digital signal by the synchronizing pulse signal and outputting the multiplication data; extracting a direct current component from the multiplication data, thereby to generate correction data; setting a lock center frequency setting value for setting a frequency of the synchronous clock obtained in a state where the correction data is not outputted, on the basis of the correction data, and outputting lock center frequency setting data indicating the lock center frequency setting value; and generating a clock of a frequency according to data obtained by adding the correction data and the lock center frequency setting data and outputting the clock as the synchronous clock. Therefore, a lock center frequency is set according to an input signal to which a synchronizing signal is added, thereby enlarging a frequency lock range.

BRIEF DESCRIPTION OF THE DRAWINGS

FIG. 15 is a flow chart illustrating a method for setting a gain adjustment value and a lock center frequency setting value in the synchronous clock generation apparatus according to the fourth embodiment of the present invention.

DETAILED DESCRIPTION OF THE INVENTION

Embodiment 1

Figure 1:
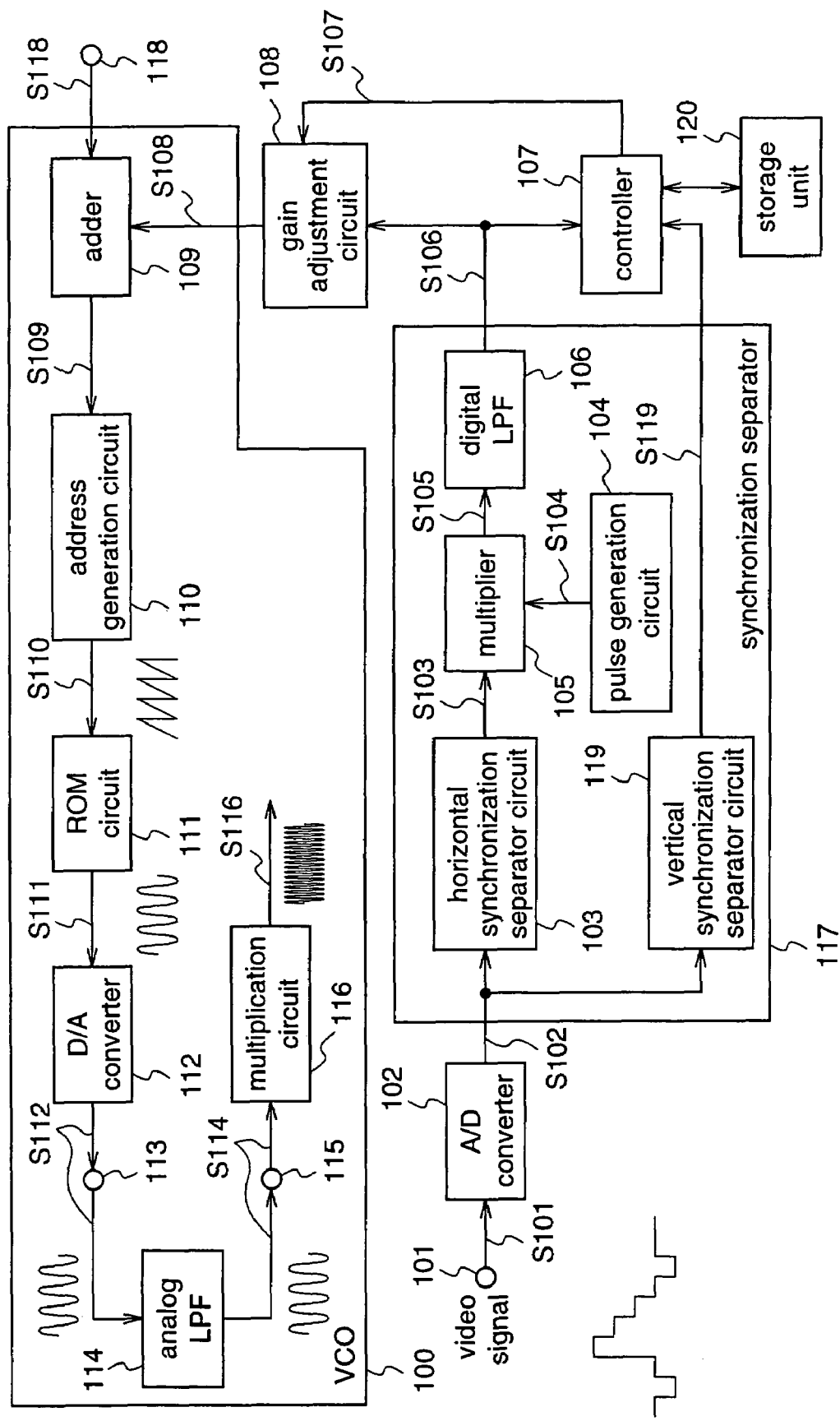
FIG. 1 is a block diagram illustrating a construction of a horizontal synchronous clock generation apparatus according to a first embodiment of the present invention.

FIG. 1 is a block diagram illustrating a construction of a synchronous clock generation apparatus according to a first embodiment of the present invention. In FIG. 1, an analog video signal S101 to which a horizontal synchronizing signal and a vertical synchronizing signal are added is input to a video signal input terminal 101. An A/D converter 102 outputs, as a digital video signal S102, a signal which is obtained by subjecting the input analog video signal S101 to digital conversion using a horizontal synchronous clock S116 outputted from a multiplication circuit 116, described later, as a reference of sampling. A horizontal synchronization separator circuit 103 outputs a horizontal synchronizing signal S103 which is separated from the digital video signal S102. A vertical synchronization separator circuit 119 separates a vertical synchronizing signal from the digital video signal S102 and outputs the vertical synchronizing signal as a vertical synchronizing pulse signal S119. A pulse generation circuit 104 counts horizontal synchronous clocks S116 up to a number determined for each broadcast system for the input analog video signal S101 to generate a horizontal synchronizing pulse signal S104 and outputs the same. A multiplier 105 multiplies the input horizontal synchronizing signal S103 by the horizontal synchronizing pulse signal S104 and outputs the obtained multiplication data S105. A digital LPF 106 outputs, as correction data S106, data which is obtained by eliminating high frequency components from the input multiplication data S105 and extracting only DC components. The horizontal synchronization separator circuit 103, multiplier 105, pulse generation circuit 104, digital LPF 106, and vertical synchronization separator circuit 119, which are described above, constitute a synchronization separator 117.

A controller 107 receives the correction data S106 outputted from the digital LPF 106, and the vertical synchronizing pulse signal S119 as a processing start signal, which is outputted from the vertical synchronization separator circuit 119, generates gain adjustment data S107 for setting a gain adjustment value, and outputs the gain adjustment data S107 to a gain adjustment circuit 108. The storage unit 120 stores data outputted from the controller 107 and outputs the stored data to the controller 107. A processing unit, such as a CPU (central processing unit) for loading and executing programs stored in a memory like a ROM (read only memory), not shown, is used as the controller 107. A RAM (random access memory) or the like is used as the storage unit 120.

The gain adjustment circuit 108 receives the correction data S106 and the gain adjustment data S107 outputted from the controller 107, performs gain adjustment on the correction data S106 on the basis of the gain adjustment data S107, and outputs the gain-adjusted correction data S108. The adder 109 receives the gain-adjusted correction data S108 and a digital control signal S118 from a digital input terminal 118, add the two signals, and outputs addition data S109. Here, the digital control signal S118 is data for determining a frequency of the horizontal synchronous clock outputted from the multiplication circuit 116 in a case where the correction data S108 is not outputted from the gain adjustment circuit 108, that is, a free-run frequency, and the frequency is generally determined according to the broadcast system. A frequency of the horizontal synchronous clock outputted from the multiplication circuit 116 is locked to a frequency which is obtained by correcting a frequency obtained on the basis of the digital control signal S118, in the positive or negative direction on the basis of the correction data S108. That is, the free-run frequency which is determined according to only the digital control signal S118 is a lock center frequency of a frequency lock range. An address generation circuit 110 performs accumulation arithmetic of the input addition data S109 to calculate an accumulated value. Here, the accumulated value is a value for which a carry-out signal is not used. Further, the address generation circuit 110 outputs, as address data S110, data which is obtained by dividing the accumulated value such that the accumulated value is adapted to an address of SIN wave data table in the ROM circuit 111 described later. The frequency of the address data S110 becomes higher as the addition data S109 becomes larger, while the frequency of the address data S110 becomes lower as the addition data S109 becomes smaller. The ROM circuit 111 holds a SIN wave data table, and when the address data S110 is input, the ROM circuit 111 refers to the SIN wave data which is held therein for each address and outputs a digital SIN wave signal S111. A D/A converter 112 converts the input digital SIN wave signal S111 into an analog signal to output the converted signal as an analog SIN wave signal S112. The analog SIN wave signal S112 is input to an analog LPF 114 through an analog SIN wave output terminal 113. The analog LPF 114 eliminates, from the analog SIN wave signal S112, digital noise generated when the D/A converter 112 performs digital-to-analog conversion, and outputs the obtained analog SIN wave signal S114. The analog SIN wave signal S114 is input to the multiplication circuit 116 through the analog SIN wave input terminal 115. A multiplication circuit 116 performs an integral multiplication of a frequency of the analog SIN wave signal S114 which is obtained by eliminating the input digital noise and outputs the obtained signal as a horizontal synchronous clock S116. The horizontal synchronous clock S116 is supplied to each of the various external video signal processors, not shown, and is supplied to the A/D converter 102 and the synchronization separator 117 as described above. The adder 109, address generation circuit 110, ROM circuit 111, D/A converter 112, analog LPF 114, and multiplication circuit 116 constitute a VCO 100. Further, the synchronous clock generation apparatus according to the first embodiment is provided on a single LSI (large-scale integrated circuit) except for the analog LPF 114. The storage unit 120 may be provided outside the LSI.

Figure 2:
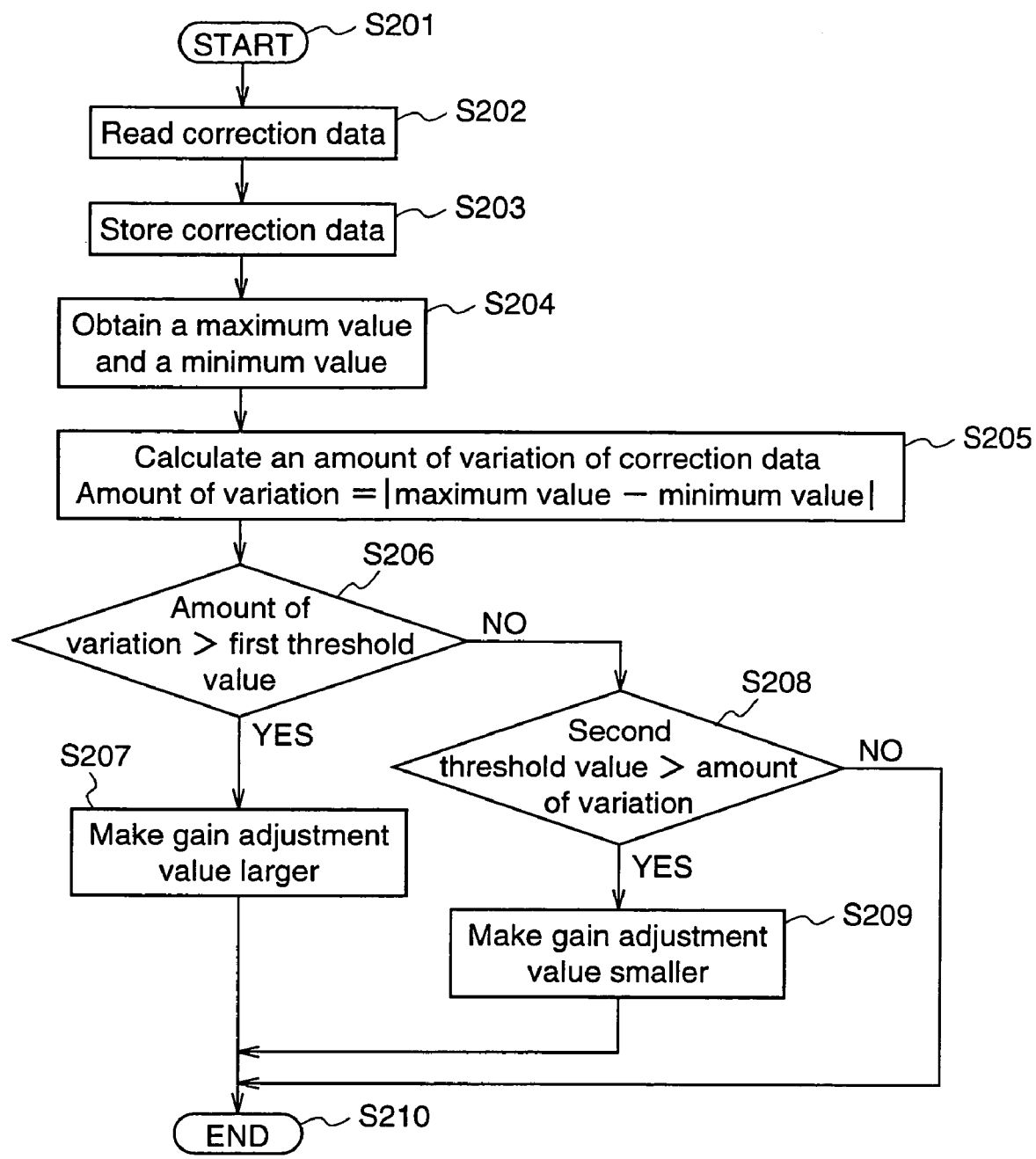
FIG. 2 is a flow chart illustrating a method for setting a gain adjustment value in the synchronous clock generation apparatus according to the first embodiment of the present invention.

FIG. 2 is a flow chart for explaining processing for setting a gain adjustment value, which is performed by the controller 107 in the synchronous clock generation apparatus according to the first embodiment. Hereinafter, the processing for setting the gain adjustment value will be described with reference to FIG. 2.

In step S201, the vertical synchronizing pulse signal S119 is received as an interrupt signal to start the gain adjustment value setting processing. In step S202, the controller 107 reads the correction data S106 from the digital LPF 106. In step S203, the read correction data is sequentially stored in the storage unit 120 such that only a predetermined number of correction data counting from the latest correction data are stored in the storage unit 120. For example, the correction data is sequentially stored in the storage unit 120 and the number of correction data stored reaches the predetermined number, and thereafter the oldest data of the correction data stored in the storage unit 120 is deleted every time the latest correction data is stored in the storage unit 120.

In step S204, a maximum value and a minimum value are obtained from among the correction data which is stored in the storage unit 120 in step S203. In step S205, the minimum value obtained in step S204 is subtracted from the maximum value obtained in step S204, and an absolute value of the obtained value is obtained, thereby calculating an amount of variation of the correction data. Next, in step S206, the amount of variation calculated in step S205 is compared with a predetermined first threshold value, and it is judged whether the amount of variation is larger than the first threshold value or not.

When it is judged in step S206 that the amount of variation is larger than the first threshold value, the processing for making the gain adjustment value larger is performed in step S207. When the gain adjustment value becomes larger, a frequency of the address data S110 outputted from the address generation circuit 110 can be made higher or lower, and as a result, the horizontal synchronous clock S116, which is synchronized with the horizontal synchronizing signal S103 of higher frequency or lower frequency, can be obtained, thereby widening the frequency lock range. Further, since the number of bits of the correction data S106 for determining the number of steps which changes frequencies of the address data S110 is not changed, the frequency lock range becomes wider, thereby reducing the frequency lock precision. That is, in this case, it is assumed that the frequency of the horizontal synchronizing signal S103 which is separated from the video signal S101 is unstable and has variations, and the frequency lock range which is determined on the basis of the currently set gain adjustment value is not sufficiently wide or that the lock precision which is determined on the basis of the currently set gain adjustment value is too high. Therefore the locking operation of the frequency as a feedback system of the synchronous clock generation apparatus is unstable. In addition, the gain adjustment value is changed in such a direction that the frequency lock range is widened, thereby stabilizing the horizontal synchronous clock generation.

When it is judged in step S206 that the amount of variation is smaller than the first threshold value, the amount of variation is compared with a predetermined second threshold value in step S208. The second threshold value is set as a value smaller than the first threshold value.

When it is judged in step S208 that the amount of variation is smaller than the second threshold value, the processing for making the gain adjustment value smaller is performed in step S209. Thereby, the frequency lock precision becomes higher as the frequency lock range becomes narrower. That is, in this case, it is assumed that the frequency of the horizontal synchronizing signal S103 which is separated from the video signal S101 is stable and has little variation, and the frequency lock range which is determined on the basis of the currently set gain adjustment value is sufficiently wide as well as the lock precision of the frequency is not too high. Therefore the locking operation of the frequency as a feedback system of the synchronous clock generation apparatus is stable. In addition, the gain adjustment value is changed in such a direction that the lock precision is further improved, thereby improving the precision in the horizontal synchronous clock generation.

The processing of step S207 or step S209 is performed, or in a case where it is judged in step S208 that the amount of variation is larger than the second threshold value, the processing for maintaining the current gain adjustment value is performed and the gain adjustment value setting is not changed, and then the gain adjustment value setting processing is completed in step S210.

Then, the first and second threshold values are determined by previously performing a test for the operation of the synchronous clock generation apparatus and the like with changing the values. By changing these values, response to the video signal of the synchronous clock generation apparatus can be changed.

Figure 3:
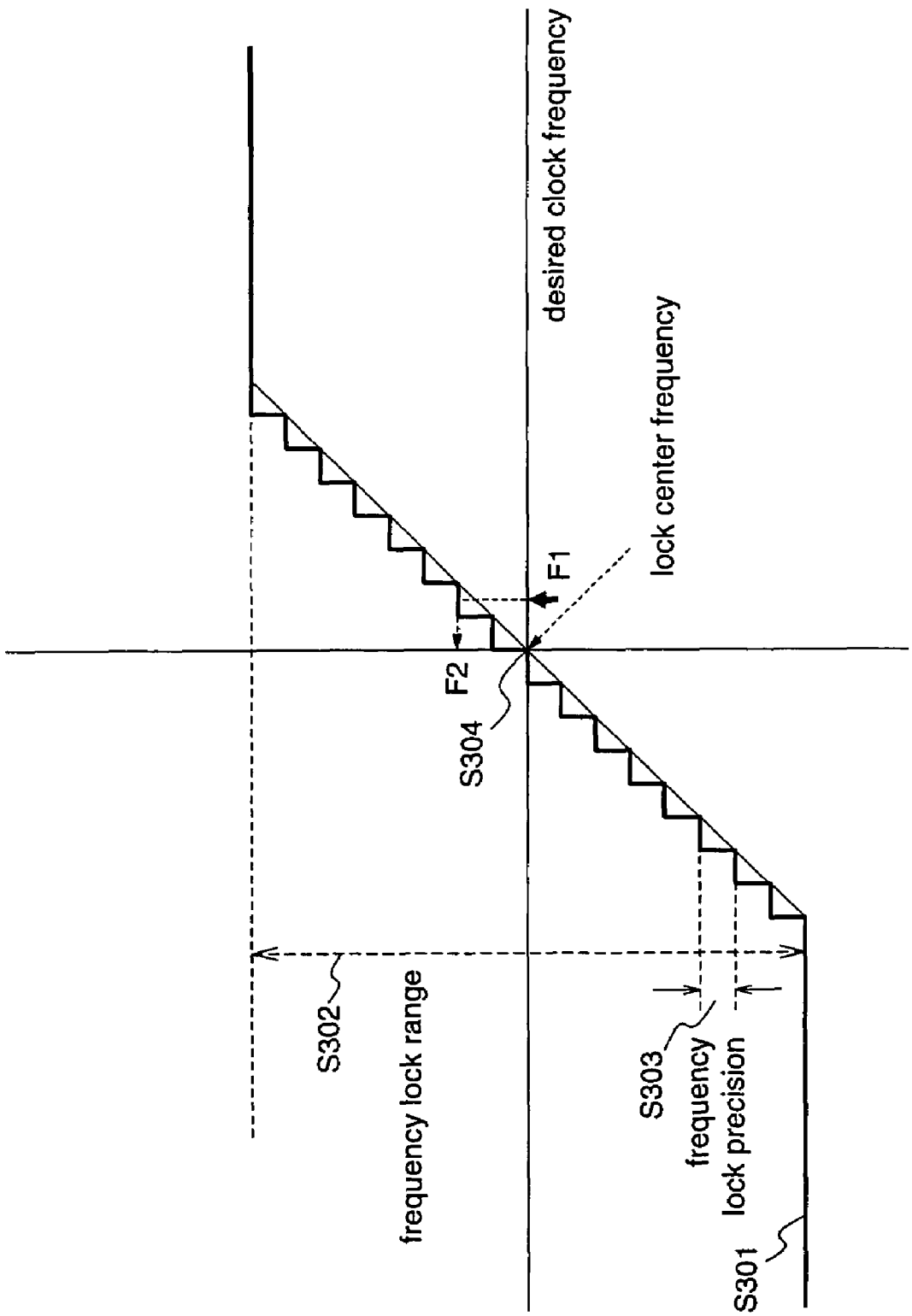
FIG. 3(a) is a diagram for explaining a performance of the synchronous clock generation apparatus according to the first embodiment and illustrating a state at the start of gain adjustment value setting processing.
FIG. 3(b) is a diagram for explaining a performance of the synchronous clock generation apparatus according to the first embodiment and illustrating a state where some time has passed since the start of the gain adjustment value setting processing.
Figure 3:
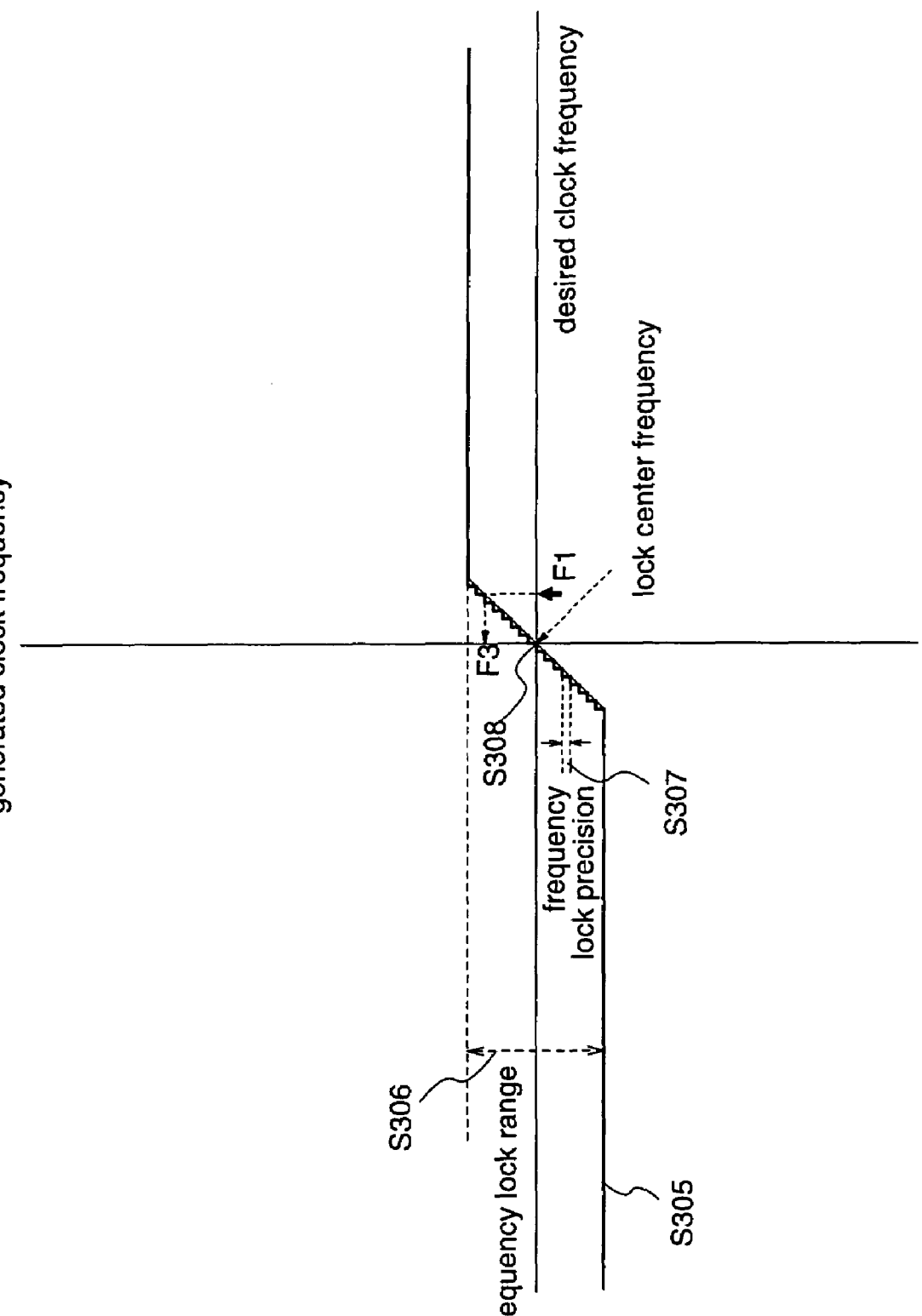

FIGS. 3(a) and 3(b) are diagrams illustrating clock frequency characteristic curves for explaining a performance of the synchronous clock generation apparatus according to the first embodiment. FIG. 3(a) shows a state at the start of gain adjustment value setting processing, and FIG. 3(b) shows a state where some time has passed since the start of the gain adjustment value setting processing. In FIGS. 3(a) and 3(b), the axis of abscissa indicates a desired clock frequency or a clock frequency which is primarily obtained when a clock frequency is completely synchronized with a horizontal synchronizing signal of a video signal, while the axis of ordinate indicates a generated clock frequency which is actually outputted from the multiplication circuit 116 in the horizontal synchronous clock generation apparatus. Each of the clock frequency characteristic curves S301 and S305 shows a relationship between the desired clock frequency and the generated clock frequency, and each of the clock frequency characteristic curves S301 and S305 is of step shape, and the desired clock frequencies consecutively change while the generated clock frequencies take non-consecutive values.

Each of the frequency lock ranges S302 and S306 indicates a range of the generated clock frequencies which can be locked. Each of the frequency lock precisions S303 and S307 is a precision for the generated clock frequency obtained with respect to the desired clock frequency, and here it is represented as a difference in frequency between the adjacent generated clock frequencies. When the frequency lock precisions S303 and S307 are high, that is, the frequency differences between the adjacent generated clock frequencies are small, the generated clock frequency can be locked to the generated clock frequency which is close to the desired clock frequency with higher precision. The frequencies S304 and S308 are generated clock frequencies in the case of the correction data S106 not being outputted from the digital LPF 106, that is, lock center frequencies, and they are determined according to the digital control signal S118. The frequency lock ranges S302 and S306 as well as the frequency lock precisions S303 and S307 are determined depending on the number of bits of the correction data S106 which is an output from the digital LPF 106 and the gain which is adjusted by the gain adjustment circuit 108.

As shown in FIG. 3(a), the frequency lock precision S303 is determined on the basis of the gain adjustment value, which is set as an initial value in the gain adjustment circuit 108 at the start of the gain adjustment value setting processing. The output from the digital LPF 106 is gain-adjusted, and thereby, for example, the generated clock frequency is locked to F2 when the desired clock frequency is F1.

However, the gain adjustment value setting processing operation is continued, and when the amount of variation of the correction data is small, the gain adjustment value is set smaller to make the frequency lock range S306 narrower, thereby making the frequency lock precision S307 higher. As a result, as shown in FIG. 3(b), when the desired clock frequency is F1, the generated clock frequency is locked to a value F3 which is closer to the desired clock frequency than F2 is. As a result, a jitter performance of the generated horizontal synchronous clock can be improved. Further, the frequency lock precision can be improved without expanding bits of correction data S106, and thereby it is not necessary to substantially increase the circuit scale, and improvement of the frequency lock precision can be realized by performing minor modification on the circuit.

As described above, according to the first embodiment, the controller 107 obtains a gain adjustment value according to the amount of variation of the correction data S106 outputted from the digital LPF 106, and the gain adjustment circuit 108 performs gain adjustment on the correction data S106 on the basis of data for setting the gain adjustment value, that is, every time a vertical synchronizing signal is inputted according to the input signal, the controller calculates gain adjustment data, and the gain adjustment circuit performs gain adjustment, thereby adapting the lock precision of the horizontal synchronous clock generated by the synchronous clock generation apparatus to the desired precision without expanding bits in the circuit configuration.

Then, while in the first embodiment a vertical synchronizing pulse signal is used as an interrupt signal for starting the gain adjustment value setting processing, other signals and the like can be used for starting the processing in the present invention. For example, a counter for counting the horizontal synchronizing signals is provided and an interrupt signal for starting the gain adjustment value setting processing may be outputted every time the horizontal synchronizing signals are counted up to a predetermined number.

Embodiment 2

A synchronous clock generation apparatus according to a second embodiment is identical to the synchronous clock generation apparatus according to the first embodiment except that a controller which corrects a lock center frequency setting value for setting a lock center frequency on the basis of the correction data outputted from the digital LPF and supplies lock center frequency setting data, indicating the corrected lock center frequency setting value, to the VCO instead of a digital control signal, is provided instead of the controller for generating gain adjustment data for setting a gain adjustment value on the basis of the correction data outputted from the digital LPF.

Figure 4:
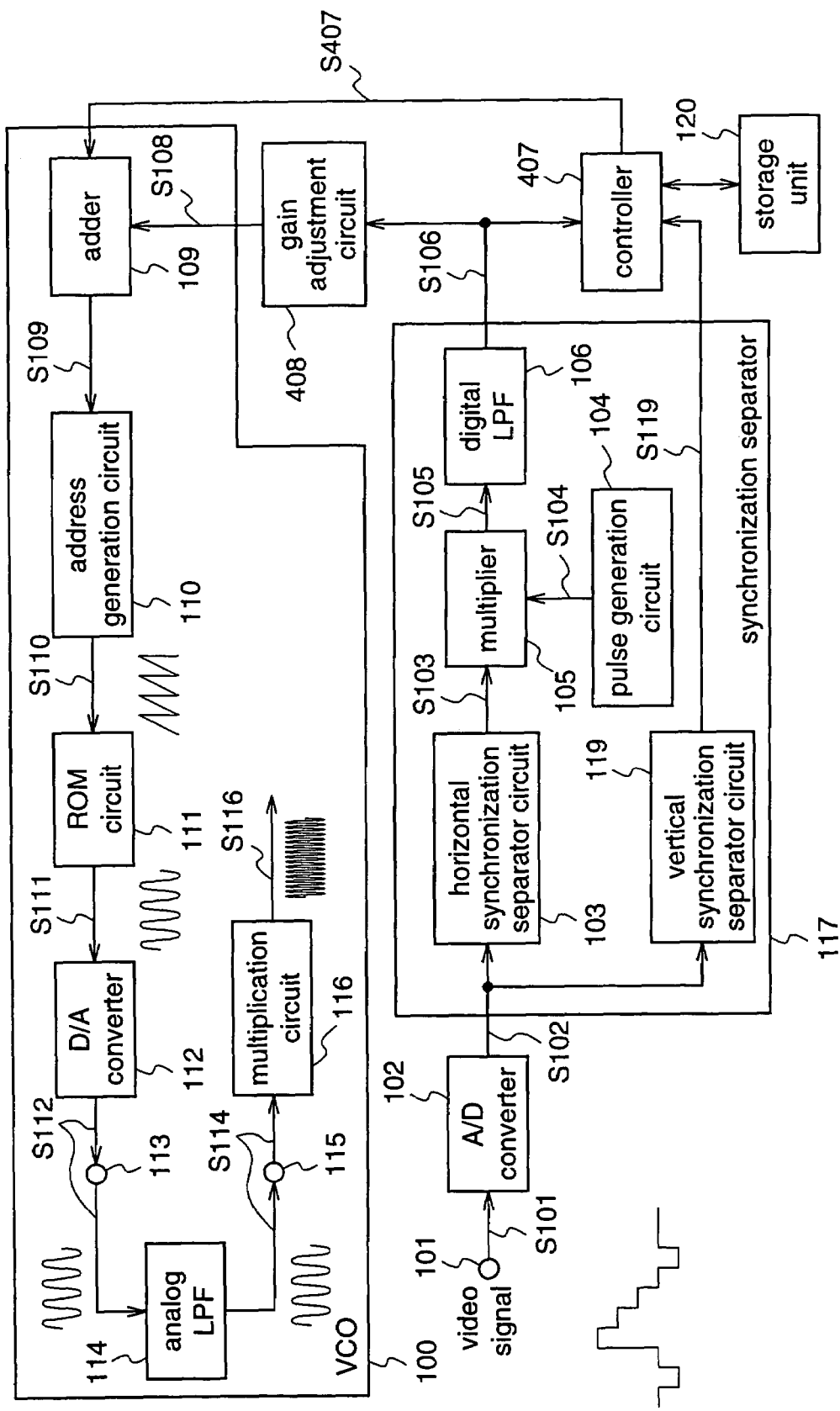
FIG. 4 is a block diagram illustrating a construction of a synchronous clock generation apparatus according to a second embodiment of the present invention.

FIG. 4 is a block diagram illustrating a construction of a synchronous clock generation apparatus according to a second embodiment of the present invention. In FIG. 4, the same reference numerals as those shown in FIG. 1 denote the same or corresponding parts. The controller 407 receives the correction data S106, and the vertical synchronizing pulse signal S119, as a processing start signal, obtains a lock center frequency setting value, generates lock center frequency setting data S407 for setting the lock center frequency setting value, and outputs the same and supplies the same to the adder 109. A processing unit, such as a CPU for loading and executing programs stored in a memory like a ROM, not shown, is used as the controller 407. The lock center frequency setting data S407 is data for determining a frequency of the horizontal synchronous clock outputted from the multiplication circuit 116 in a case where correction data S106 is not supplied from the digital LPF 106, and it is a value for setting a center frequency in the frequency lock range in the synchronous clock generation apparatus. An initial value of the lock center frequency setting data S407 is a value which is set so as to obtain the horizontal synchronous clock S116 which is completely synchronized with the normal video signal S101 in a state where the correction data S106 is not supplied and the value is generally determined according to the broadcast system. The gain adjustment circuit 408 performs gain adjustment on the input correction data S106 on the basis of the value which is predetermined by the hardware, and outputs gain-adjusted correction data S108. The adder 109 receives the gain-adjusted correction data S108 and the lock center frequency setting data S407 from the controller 407, adds the two signals, and outputs addition data S109.

Figure 5:
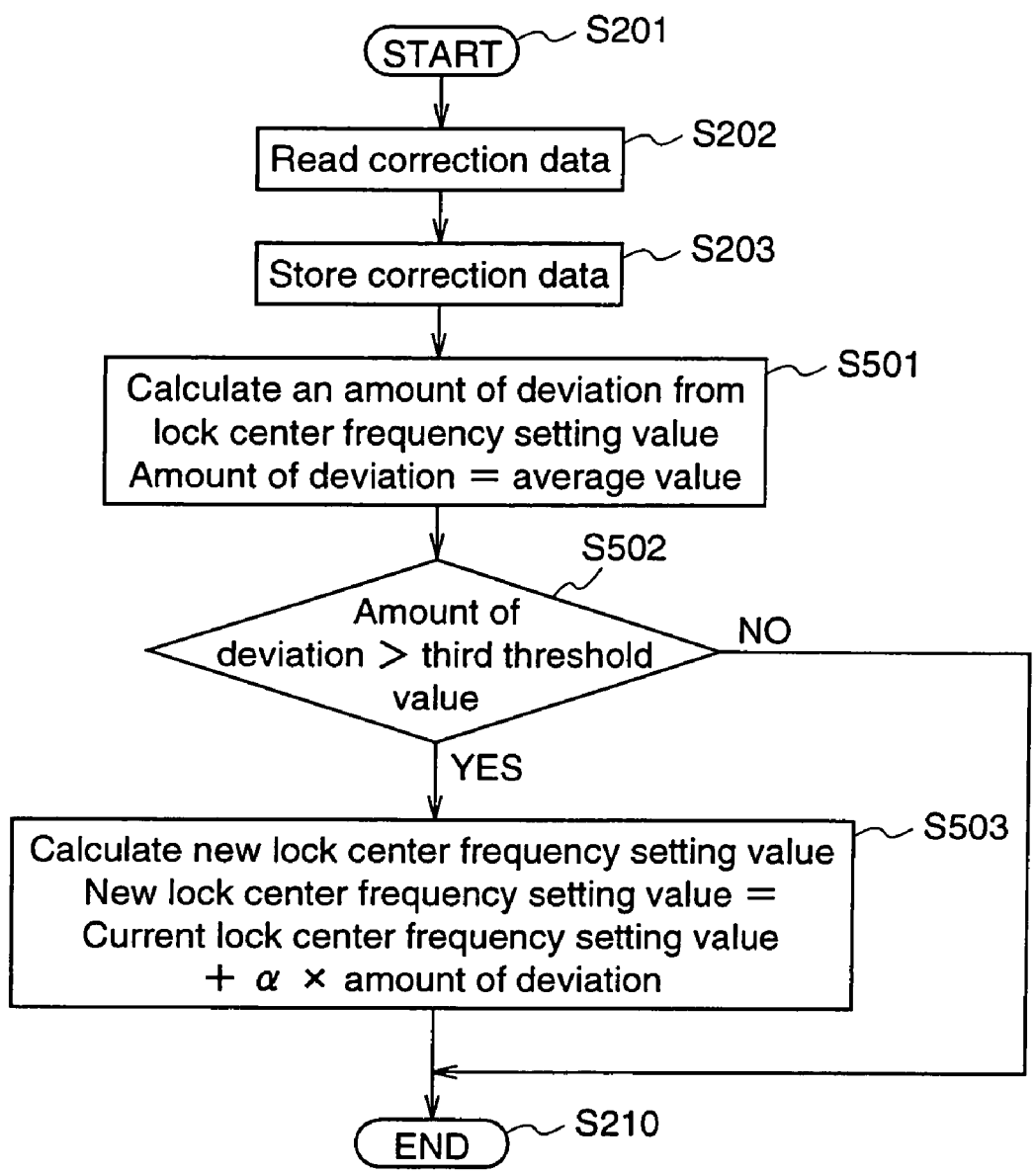
FIG. 5 is a flow chart illustrating a method for setting a lock center frequency setting value in the synchronous clock generation apparatus according to the second embodiment of the present invention.

FIG. 5 is a flow chart for explaining processing for setting a center frequency setting value, which is performed by the controller 407 in the synchronous clock generation apparatus according to the second embodiment. The same reference numerals as those shown in FIG. 2 denote the same or corresponding processing steps.

Hereinafter, processing for setting the center frequency setting value, which is performed by the controller 407 in the synchronous clock generation apparatus, will be described with reference to FIG. 5.

In step S201, the vertical synchronizing pulse signal S119 is received as an interrupt signal to start the gain adjustment value setting processing. In step S202, the correction data S106 from the digital LPF 106 is captured by the controller 407. In step S203, the captured correction data is sequentially stored in the storage unit 120 such that only a predetermined number of correction data counting from the latest correction data are stored in the storage unit 120. For example, the correction data is sequentially stored in the storage unit 120 and the number of correction data stored reaches the predetermined number, and thereafter the oldest data of the correction data stored in the storage unit 120 is deleted every time the latest correction data is stored in the storage unit 120.

In step S501, an average value of the correction data S106 stored in the storage unit in step S203 is calculated as an amount of deviation of the correction data S106 from the current lock center frequency setting value. Here, the amount of deviation is 0 or a value with a plus sign or minus sign.

Next, in step S502, the amount of deviation calculated in step S501 is compared with a predetermined third threshold value.

When the amount of deviation is larger than the third threshold value, a value, which is obtained by multiplying the amount of deviation by a predetermined coefficient α, is added to the current lock center frequency setting value, thereby calculating a new lock center frequency setting value, in step S503. Then, the lock center frequency setting data S407 for setting the new lock center frequency setting value is outputted to the adder 109. Thereby, in the synchronous clock generation apparatus, in a case where the synchronous clock outputted from the multiplication circuit 116 is frequency-locked at a position displaced from the lock center frequency, the lock center frequency setting value is changed. Thereby the frequency lock range can be displaced so that the position where the synchronous clock is frequency-locked is adjacent to the lock center frequency.

The processing of step S503 is performed, or in a case where it is judged in step S502 that the amount of deviation is equal to or smaller than the third threshold value, the lock center frequency setting value is not changed, and the processing for setting the lock center frequency is completed in step S210.

Then, the third threshold value is determined by previously performing a test for the operation of the synchronous clock generation apparatus and the like with changing the values. Further, the value of the coefficient α is a value for setting an intensity in the case of modifying the deviation of the center frequency setting value. When the value is set to "1", the modification is made by the same amount as the amount of deviation obtained in step S501 at one time. However, immediately after the modification is made, the gain-adjusted correction data S108 is also added by the adder 109 in the VCO 100, and therefore there may be some cases that the frequency of the synchronous clock obtained by the multiplication circuit 116 is abruptly changed and some influence is exerted on the processing of the video signal. Therefore, an optimal value is set as the value of the coefficient as required by performing a test or the like.

Figure 6:
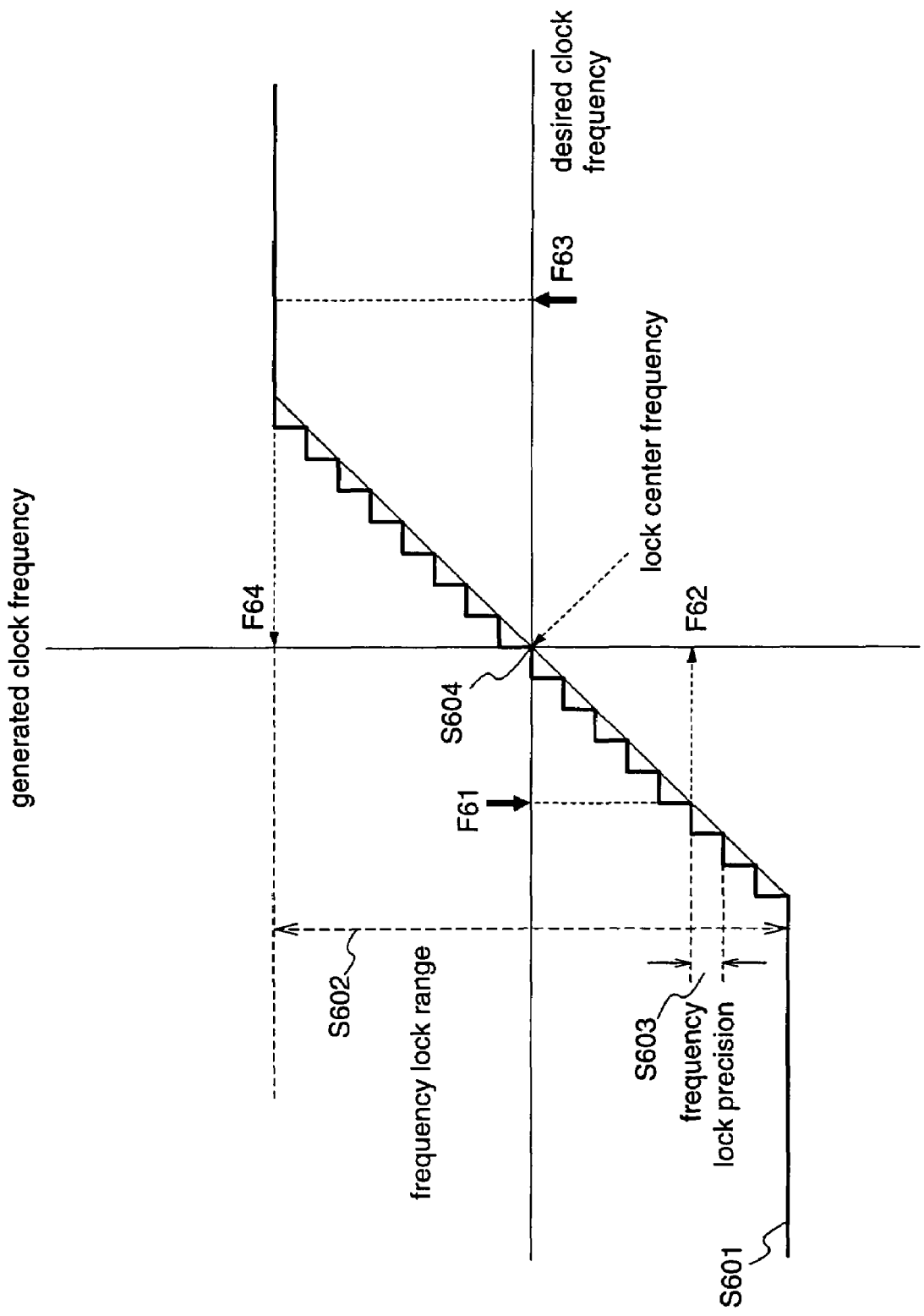
FIG. 6(a) is a diagram for explaining a performance of the synchronous clock generation apparatus according to the second embodiment and illustrating a state at the start of the processing for setting the lock center frequency setting value.
FIG. 6(b) is a diagram for explaining a performance of the synchronous clock generation apparatus according to the second embodiment and illustrating a state where some time has passed since the start of the processing for setting the lock center frequency setting value.
Figure 6:
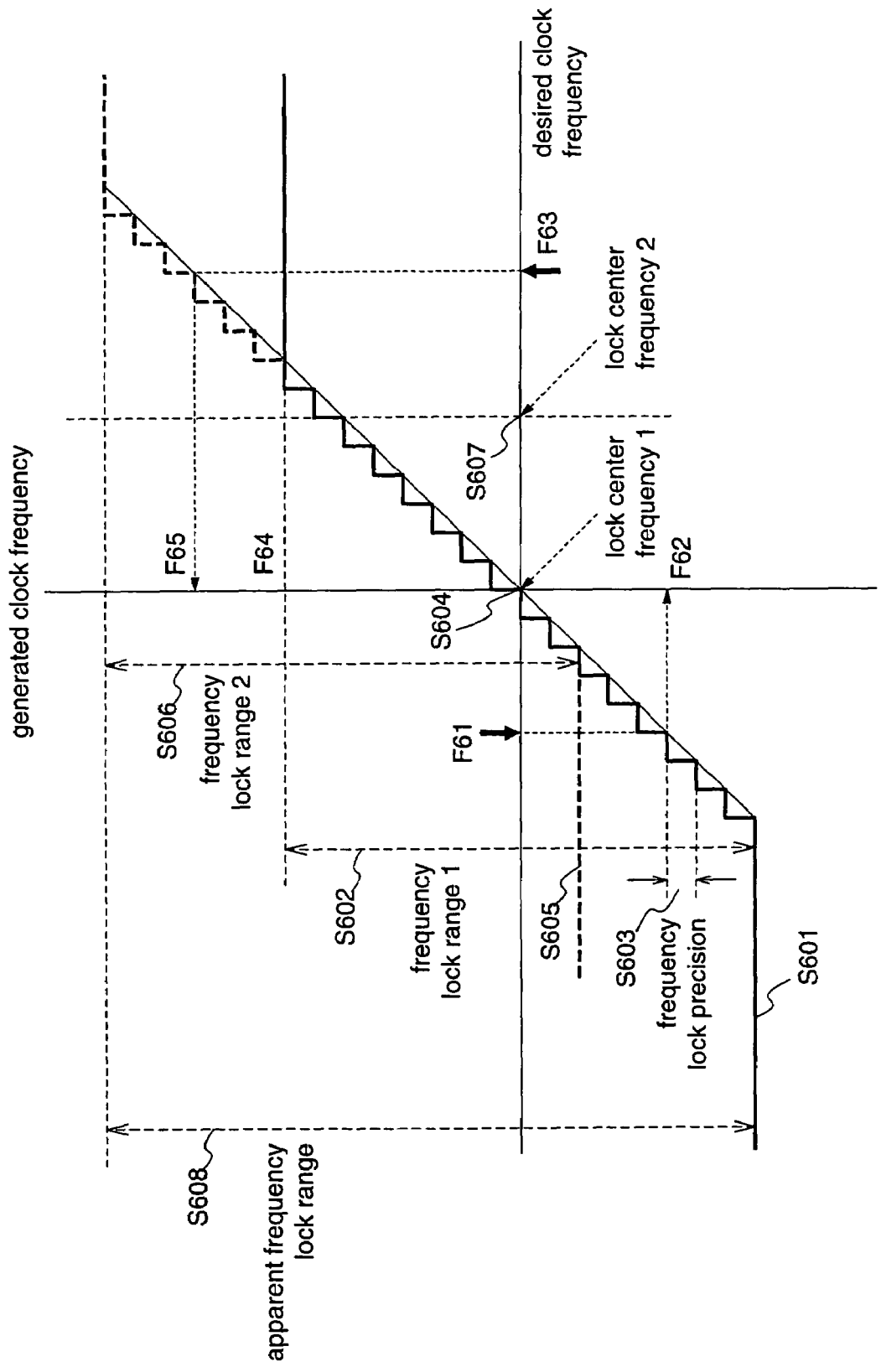

FIGS. 6(a) and 6(b) are diagrams illustrating clock frequency characteristic curves for explaining a performance of the synchronous clock generation apparatus according to the second embodiment. FIG. 6(a) shows a state at the start of the processing for setting the lock center frequency setting value, and FIG. 6(b) shows a state where some time has passed since the start of the processing for setting the lock center frequency setting value. In FIGS. 6(a) and 6(b), the axis of abscissa indicates a desired clock frequency while the axis of ordinate indicates a generated clock frequency. Each of the clock frequency characteristic curves S601 and S605 shows a relationship between the desired clock frequency and the generated clock frequency, and each of the clock frequency characteristic curves S601 an S605 is of step shape, and the desired clock frequencies consecutively change while the generated clock frequencies take non-consecutive values. Each of the frequency lock ranges S602 and S606 indicates a range of the generated clock frequency which can be locked. Further, the frequency lock range S608 indicates an apparent frequency lock range. The frequency lock precision S603 is a precision for the generated clock frequency obtained with respect to the desired clock frequency. The frequencies S604 and S607 are generated clock frequencies in the case of the correction data S106 being not supplied from the digital LPF 106, that is, lock center frequencies.

As shown in FIG. 6(a), the lock center frequency S604 is set on the basis of an initial value of the lock center frequency setting value supplied from the controller 407 at the start of processing for setting the lock center frequency setting value. Then, when the desired clock frequency is F61, the generated clock frequency is F62, and the generated clock frequency F62 is within the frequency lock range S602, having the lock center frequency S604 at the center thereof, and thereby the generated clock frequency can be frequency-locked. However, when the desired clock frequency is F63 which is a value larger than a value corresponding to a maximum value of the generated clock frequency within the frequency lock range S602, the generated clock frequency is F64. Accordingly, a clock which is outside the frequency lock range, determined on the basis of the initial value of the lock center frequency setting value, cannot be generated at the start of processing for setting the lock center frequency.

However, in a case where the desired frequency clock is F63, when the amount of deviation between the correction data S106 and the lock center frequency setting value is obtained to calculate and set the lock center frequency setting value which is corrected on the basis of the amount of deviation, the lock center frequency S604 is changed to the lock center frequency S607 in accordance with the desired clock frequency F63, and with this, the frequency lock range S602 is changed to the frequency lock range S606 in accordance with the desired clock frequency F63, and the generated clock frequency which is obtained with respect to the desired clock frequency F63 is F65. Thereby the generated clock frequency can be frequency-locked to the generated clock frequency F65 which is closer to the desired clock frequency F63 than the generated clock frequency F64 obtained when the initial value is used as the lock center frequency setting value, as shown in FIG. 6(b). That is, in this case, both the lock center frequency S604, which is determined on the basis of the initial value of the lock center frequency setting value, and the lock center frequency S607, which is set on the basis of the lock center frequency setting value which is set in accordance with the desired clock frequency F63, are present, and the frequency lock ranges are present in accordance with the lock center frequencies, respectively. Therefore the frequency lock range S608, which is the portion of the sum of two frequency lock ranges, can be regarded as a frequency lock range, thereby enabling the apparent frequency lock range to be enlarged. Further, the frequency lock range can be enlarged without expanding bits of the correction data S106, and thereby it is not necessary to substantially increase the circuit scale and the synchronous clock generation apparatus can be realized by performing minor modification on the circuit.

As described above, according to the second embodiment, the controller 407 obtains the lock center frequency setting value S407 in accordance with the amount of deviation of the correction data S106 outputted from the digital LPF 106, and the lock center frequency is set on the basis of the data for setting the lock center frequency setting value. That is, every time the vertical synchronizing signal is input according to the input signal, the controller calculates an amount of deviation on the basis of the correction data, and determines the lock center frequency setting data from the result, and the adder changes the lock center frequency, and thereby the input signal is made to trace the horizontal synchronous clock for generating a lock range of the horizontal synchronous clock generated by the synchronous clock generation apparatus without expanding bits in the circuit configuration and the lock range can be enlarged.

Embodiment 3

A synchronous clock generation apparatus according to a third embodiment performs setting of the lock center frequency setting value in a controller similarly to the controller in the synchronous clock generation apparatus according to the second embodiment, in the synchronous clock generation apparatus according to the first embodiment.

Figure 7:
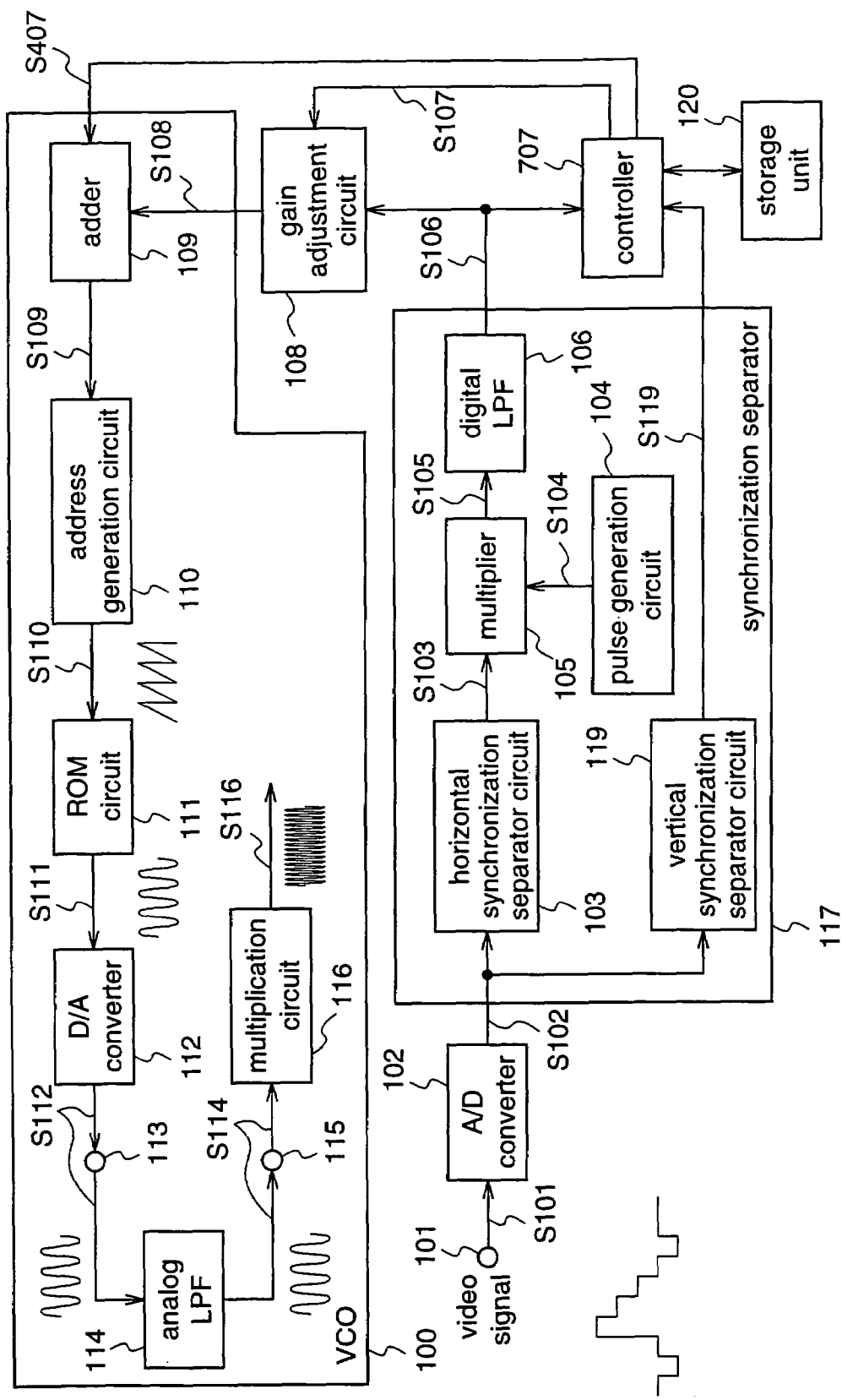
FIG. 7 is a block diagram illustrating a construction of a synchronous clock generation apparatus according to a third embodiment of the present invention.

FIG. 7 is a block diagram illustrating a construction of a synchronous clock generation apparatus according to a third embodiment of the present invention. In FIG. 7, the same reference numerals as those shown in FIG. 1 and FIG. 4 denote the same or corresponding parts. The controller 707 receives the correction data S106, and the vertical synchronizing pulse signal S119, as a processing start signal, generates gain adjustment data S107 for setting a gain adjustment value to output the same as well as the controller 707 obtains a lock center frequency setting value, generates the lock center frequency setting data S407 for setting the lock center frequency setting value to output the same, and supplies the same to the adder 109. A processing unit, such as a CPU for loading and executing programs stored in a memory like a ROM, not shown, is used as the controller 707.

Figure 8:
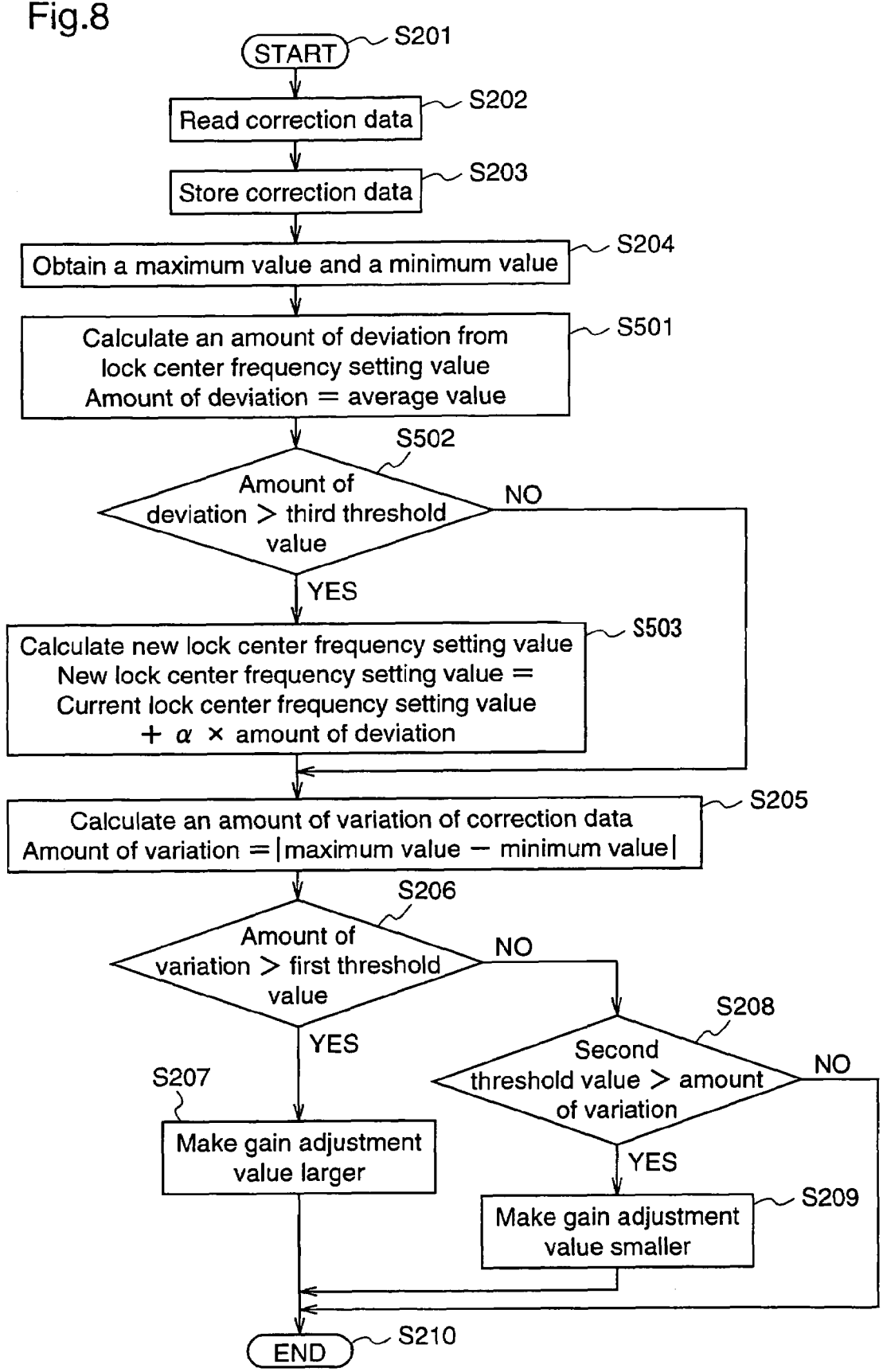
FIG. 8 is a flow chart illustrating a method for setting the gain adjustment value and the lock center frequency setting value in the synchronous clock generation apparatus according to the third embodiment of the present invention.

FIG. 8 is a flow chart for explaining processing for setting a gain adjustment value and a lock center frequency setting value, which is performed by the controller 707 in the synchronous clock generation apparatus according to the third embodiment. In FIG. 8, the same reference numerals as those shown in FIGS. 2 and 5 denote the same or corresponding processing steps.

Hereinafter, the processing for setting the gain adjustment value and the lock center frequency setting value, which is performed by the controller 707 in the synchronous clock generation apparatus, will be described with reference to FIG. 8.

In step S201, the vertical synchronizing pulse signal S119 is received as an interrupt signal to start the processing for setting a gain adjustment value and the processing for setting a lock center frequency. In step S202, the correction data S106 from the digital LPF 106 is captured by the controller 707. In step S203, the captured correction data S106 are sequentially stored in the storage unit 120 such that only a predetermined number of correction data S106, counting from the latest correction data, is stored in the storage unit 120.

In step S204, a maximum value and a minimum value of the correction data S106 stored in the storage unit 120 are obtained. In step S501, an average value of the correction data S106 stored in the storage unit 120 is calculated as an amount of deviation of the correction data S106 from the current lock center frequency setting value. Here, the amount of deviation is 0 or a value with a plus sign or minus sign.

Next, in step S502, the amount of deviation calculated in step S501 is compared with the third threshold value which is described in the second embodiment.

When the amount of deviation is larger than the third threshold value, a value which is obtained by multiplying the amount of deviation by the coefficient α, which is described in the second embodiment, is added to the current lock center frequency setting value, thereby calculating a new lock center frequency setting value, in step S503. Then, the lock center frequency setting data S407 for setting the new lock center frequency setting value is outputted to the adder 109.

The processing of step S503 is performed, or in a case where it is judged in step S502 that the amount of deviation is equal to or smaller than the third threshold value, the minimum value obtained in step S204 is subtracted from the maximum value obtained in step S204, and an absolute value of the calculated value is obtained, thereby calculating the amount of variation of the correction data S106, in step S205. In step S206, the amount of variation calculated in step S205 is compared with the first threshold value which is described in the first embodiment and it is judged whether the amount of variation is larger than the first threshold value or not.

When it is judged in step S206 that the amount of variation is larger than the first threshold value, the processing for making the gain adjustment value larger is performed in step S207.

When it is judged in step S206 that the amount of variation is smaller than the first threshold value, the amount of variation is compared with the second threshold value, which is described in the first embodiment in step S208. When it is judged in step S208 that the amount of variation is smaller than the second threshold value, the processing for making the gain adjustment value smaller is performed in step S209.

The processing of step S207 or step S209 is performed, or in a case where it is judged in step S208 that the amount of variation is larger than the second threshold value, the processing for maintaining the current gain adjustment value is performed, and the processing is completed in step S210.

As described above, according to the third embodiment, the lock center frequency is set on the basis of the lock center frequency setting value S407, which the controller 707 obtains according to the amount of deviation of the correction data S106 outputted from the digital LPF 106, and further the gain adjustment circuit 108 performs gain adjustment on the correction data S106 on the basis of the gain adjustment value which the controller 707 obtains according to the amount of variation of the correction data S106 outputted from the digital LPF 106. That is, according to the third embodiment, every time the vertical synchronizing signal is input according to the input signal, the controller calculates the gain adjustment data and the lock center frequency setting data, the gain adjustment circuit performs gain adjustment on the basis of the gain adjustment data, and the adder performs addition on the basis of the lock center frequency setting data. Therefore, the lock precision of the horizontal synchronous clock generated by the synchronous clock generation apparatus is adapted to the desired precision, and the lock range can be enlarged without expanding bits in the circuit configuration by making the input signal trace the horizontal synchronous clock which generates the lock range, and both the gain adjustment data and the lock center frequency setting data can be controlled. Therefore, the fluctuation in horizontal synchronous clock, which is temporarily generated when changing the lock center frequency setting data, can be reduced by adjusting the gain adjustment data.

Embodiment 4

A synchronous clock generation apparatus according to a fourth embodiment performs setting of the lock center frequency setting value in a controller in a similar manner as to the controller in the synchronous clock generation apparatus according to the second embodiment and uses only two gain adjustment values for gain adjustment, in the synchronous clock generation apparatus according to the first embodiment.

Figure 14:
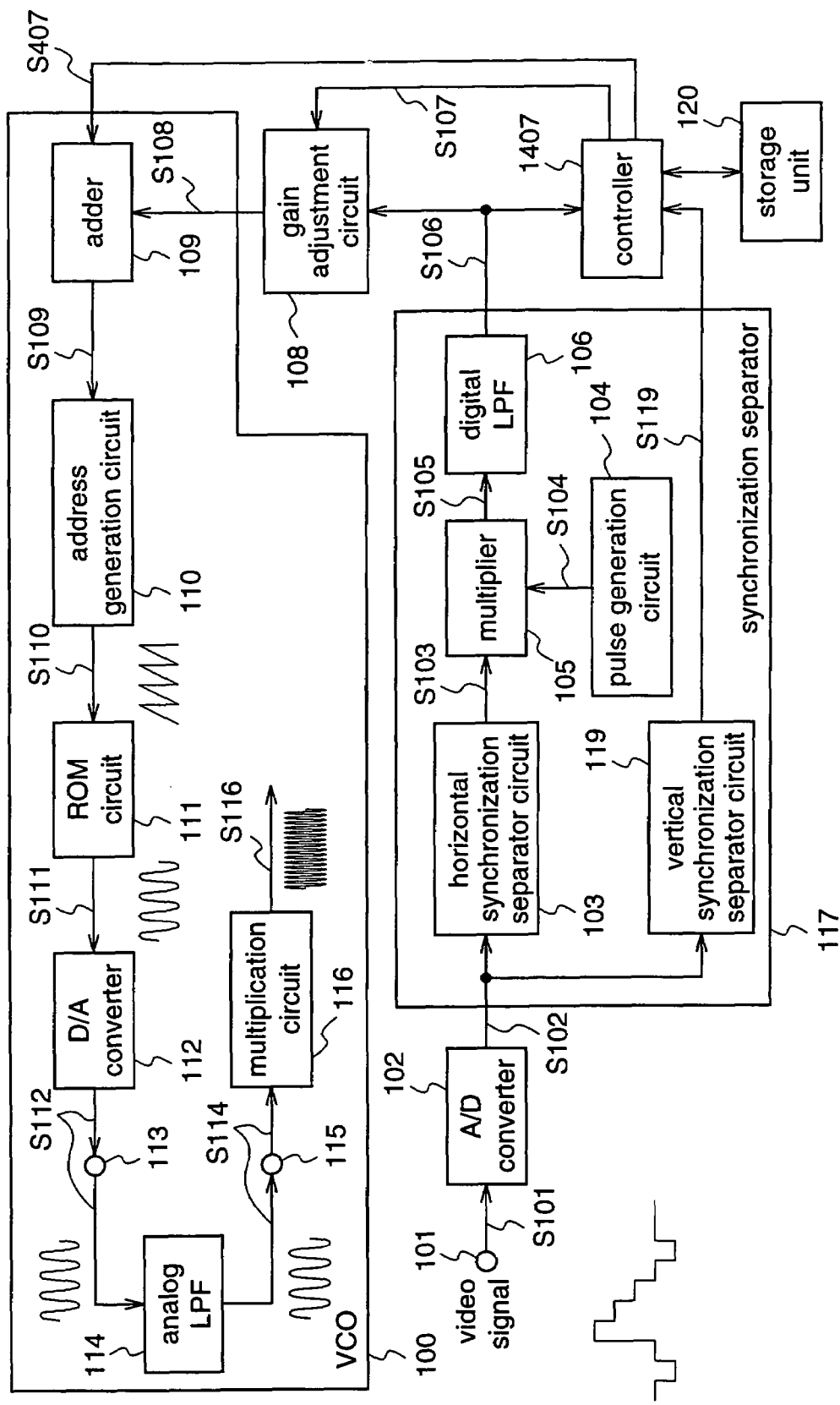
FIG. 14 is a block diagram illustrating a construction of a synchronous clock generation apparatus according to a fourth embodiment of the present invention.

FIG. 14 is a block diagram illustrating a construction of a synchronous clock generation apparatus according to the fourth embodiment of the present invention. In FIG. 14, the same reference numerals as those shown in FIGS. 1 and 4 denote the same or corresponding parts. The controller 1407 receives the correction data S106, and the vertical synchronizing pulse signal S119 as a processing start signal, generates gain adjustment data S107 for setting a gain adjustment value, and outputs the same. The controller 1407 obtains a lock center frequency setting value, generates lock center frequency setting data S407 for setting the lock center frequency setting value, and outputs the same. An initial value of the lock center frequency setting data S407 is a value which is set so as to obtain the horizontal synchronous clock S116 which is completely synchronized with the normal video signal S101 with no correction data being supplied and the value is generally determined according to the broadcast system. A processing unit, such as a CPU for loading and executing programs stored in a memory like a ROM, not shown, is used as the controller 1407.

FIG. 15 is a flow chart for explaining the processing for setting a gain adjustment value and a lock center frequency setting value, which is performed by the controller 1407 in the synchronous clock generation apparatus according to the fourth embodiment. In FIG. 15, the same reference numerals as those shown in FIGS. 2 and 5 denote the same or corresponding processing steps.

Hereinafter, the processing for setting the gain adjustment value and the lock center frequency setting value, which is performed by the controller 1407 in the synchronous clock generation apparatus, will be described with reference to FIG. 15.

In step S201, the vertical synchronizing pulse signal S119 is received as an interrupt signal to start the processing for setting a gain adjustment value and the processing for setting a lock center frequency. In step S202, the controller 1407 captures the correction data S106 from the digital LPF 106. In step S203, the captured correction data S106 is sequentially stored in the storage unit 120 such that only a predetermined number of correction data S106 counting from the latest correction data is stored in the storage unit 120.

In step S204, a maximum value and a minimum value of the correction data S106 stored in the storage unit 120 is obtained. In step S205, the minimum value obtained in step S204 is subtracted from the maximum value obtained in step S204, and an absolute value of the obtained value is obtained, thereby calculation an amount of variation of the correction data S106. In step S501, an average value of the correction data S106 stored in the storage unit 120 is calculated as an amount of deviation of the correction data S106 from the current lock center frequency setting value. Here, the amount of deviation is 0 or a value with a plus sign or minus sign. Subsequently, in step S206, the amount of variation which is calculated in step S205 is compared with the first threshold value described in the first embodiment and it is judged whether the amount of variation is larger than the first threshold value or not.

When it is judged in step S206 that the amount of variation is equal to or smaller than the first threshold value, it is judged in step S1401 whether the gain adjustment value, which is currently used at the gain adjustment in the gain adjustment circuit 108, is a first gain adjustment value or a second gain adjustment value. The first gain adjustment value is a value larger than the second gain adjustment value. These values are determined by performing a test using a video signal to be set, and the like. The initial value of the gain adjustment value used in the gain adjustment circuit 108 is made the first gain adjustment value.

When it is judged in step S1401 that the current gain adjustment value is the first gain adjustment value, it is judged in step S1403 whether the amount of variation is smaller than the second threshold value described in the first embodiment or not. When it is judged in step S1403 that the amount of variation is smaller than the second threshold value, a value which is obtained by multiplying the amount of deviation by the coefficient α, which is described in the second embodiment, is added to the current lock center frequency setting value, thereby calculating a new lock center frequency setting value, in step S1406. The new lock center frequency setting value is outputted to the adder 109 as the lock center frequency setting data S407. Subsequently, in step S1407, the processing for setting the gain adjustment value to the second gain adjustment value is performed, and the gain adjustment data S107 for setting the second gain adjustment value is outputted to the gain adjustment circuit 108, and the processing is completed in step S1408. In addition, also when it is judged in step S1403 that the amount of variation is equal to or larger than the second threshold value, the processing is completed in step S1408.

When it is judged in step S1401 that the current gain adjustment value is the second gain adjustment value, it is judged in step S1402 whether the amount of deviation calculated in step S501 is larger than the third threshold value which is described in the second embodiment or not. When it is judged that the amount of deviation is larger than the third threshold value, the processing for setting the gain adjustment value to the first gain adjustment value is performed, and the gain adjustment data S107 for setting the first gain adjustment value is outputted to the gain adjustment circuit 108 in step S1404, and the lock center frequency setting value is set to the initial value in step S1405, and the processing is completed in step S1408. In addition, also when it is judged that the amount of deviation is equal to or smaller than the third threshold value, the processing is completed in step S1408.

When it is judged in step S206 that the amount of variation is larger than the first threshold value, the processing for setting the gain adjustment value to the first gain adjustment value is performed in step S1404, and thereafter the lock center frequency setting value is set to the initial value in step S1405, and the processing is completed in step S1408. The steps S1404 and S1405 are processing for resetting the gain adjustment value and the lock center frequency setting value to the initial state when the amount of variation and the amount of deviation of the correction data are large.

As described above, according to the fourth embodiment, the lock center frequency is set on the basis of the lock center frequency setting value S407 which the controller 1407 sets according to the amount of deviation of the correction data S106 outputted from the digital LPF 106, and further the gain adjustment circuit 108 performs gain adjustment on the correction data S106 on the basis of the gain adjustment value, which the controller 1407 sets according to the amount of variation of the correction data S106 outputted from the digital LPF 106. That is, according to the fourth embodiment, every time the vertical synchronizing signal is input according to the input signal, the controller calculates the gain adjustment data and the lock center frequency setting data, and the gain adjustment circuit performs gain adjustment on the basis of the gain adjustment data, and the adder performs addition on the basis of the lock center frequency setting data. Therefore, the lock precision of the horizontal synchronous clock, generated by the horizontal synchronous clock apparatus, is adapted to the desired precision, and the lock range can be enlarged without expanding bits in the circuit configuration by making the input signal trace the horizontal synchronous clock for generating the lock range, and both the gain adjustment data and the lock center frequency setting data can be controlled. Therefore, the fluctuation in horizontal synchronous clock, which is temporarily generated when changing the lock center frequency setting data, can be reduced by adjusting the gain adjustment data. Further, only the first and second gain adjustment values are used as the gain adjustment value, thereby reducing the amount of processing in the controller 1407 and increasing the efficiency and speed of the processing.

Embodiment 5

A synchronous clock generation apparatus according to a fifth embodiment uses a gain variable digital LPF instead of the digital LPF, and generates LPF gain adjustment data for setting a gain adjustment value of the gain variable digital LPF with a controller, in the synchronous clock generation apparatus according to the third embodiment.

Figure 9:
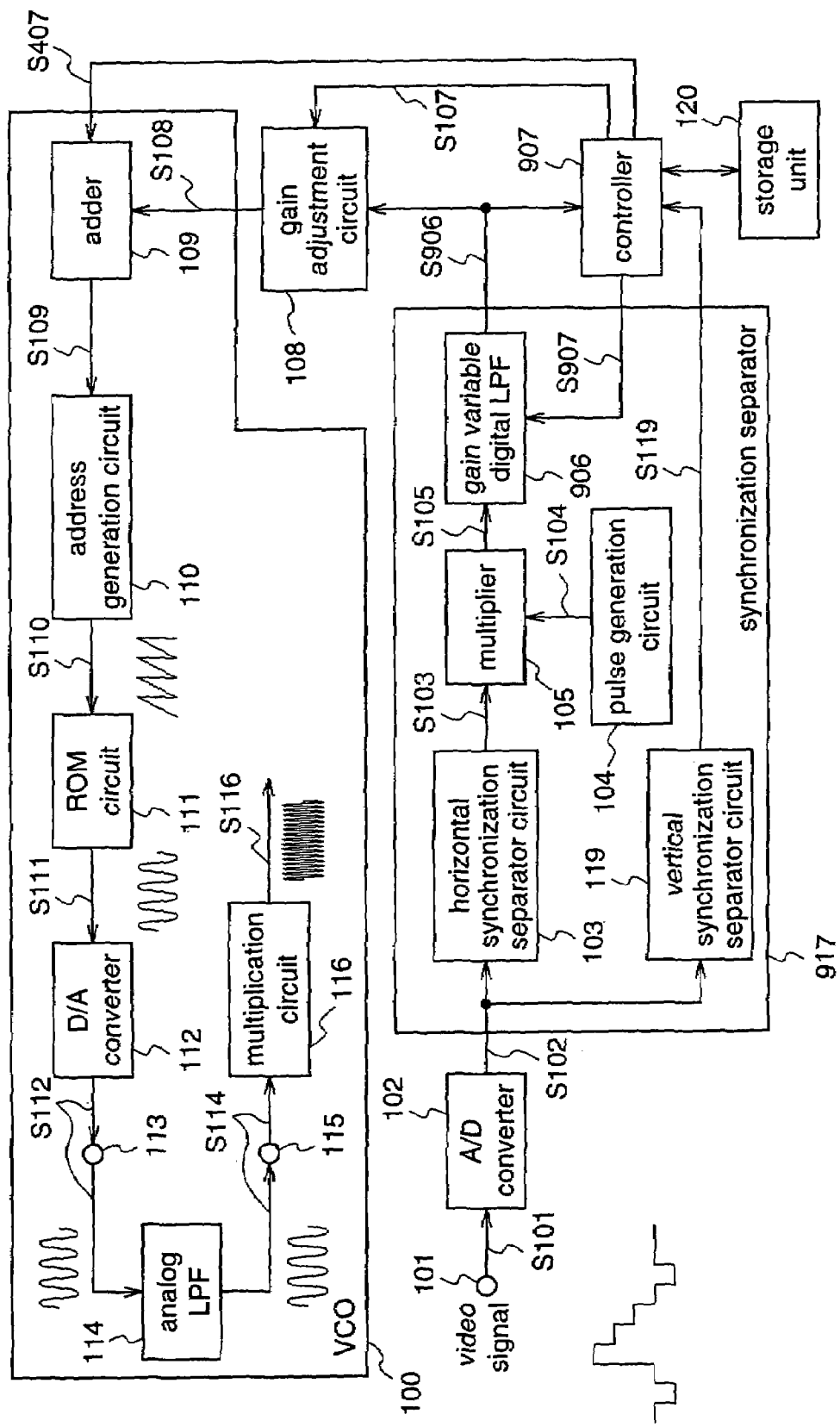
FIG. 9 is a block diagram illustrating a construction of a synchronous clock generation apparatus according to a fifth embodiment of the present invention.

FIG. 9 is a block diagram illustrating a construction of a synchronous clock generation apparatus according to a fifth embodiment of the present invention. In FIG. 9, the same reference numerals as those shown in FIG. 7 denote the same or corresponding parts. The gain variable digital LPF 906 outputs, as correction data S906, data which is obtained by eliminating high frequency components from the input multiplication data S105 and extracting only DC components as well as can change only the gain which is supplied to the high frequency components of the multiplication data S105 on the basis of the LPF gain adjustment data S907. When the gain which is supplied to high frequency components by the gain variable digital LPF 906 is large, the DC component of the correction data S906, which is gain-adjusted by the gain variable digital LPF 906 and passes through the gain variable digital LPF 906, becomes large. On the other hand, when the gain, which is supplied to high frequency components by the gain variable digital LPF 906, is small, the DC component of the correction data S906, which is gain-adjusted by the gain variable digital LPF 906 and passes through the gain variable digital LPF 906, becomes small. In this synchronous clock generation apparatus, when a gain adjustment value for high frequency component of the gain variable digital LPF 906 is made larger, the response speed for stabilizing the horizontal synchronizing signal S103 becomes faster while the jitter performance becomes worse. Conversely, when the gain adjustment value is made smaller, the response speed becomes slower while the jitter performance becomes better. The synchronization separator 917 is identical to the synchronization separator in the synchronous clock generation apparatus according to the third embodiment except that the gain variable digital LPF replaces the digital LPF.

The controller 907 receives the correction data S906, and the vertical synchronizing pulse signal S119 as a processing start signal, generates gain adjustment data S107 for setting a gain adjustment value, and outputs the same to the gain adjustment circuit 108 as well as the controller 907 obtains a lock center frequency setting value, generates the lock center frequency setting data S407 for setting the lock center frequency setting value, and outputs the same to the adder 109. Further, the controller 907 generates LPF gain adjustment data S907 for setting a gain adjustment value of the gain variable digital LPF on the basis of the correction data S906, and outputs the same to the gain variable digital LPF 906. A processing unit, such as a CPU for loading and executing programs stored in a memory like a ROM, not shown, is used as the controller 907.

Figure 10:
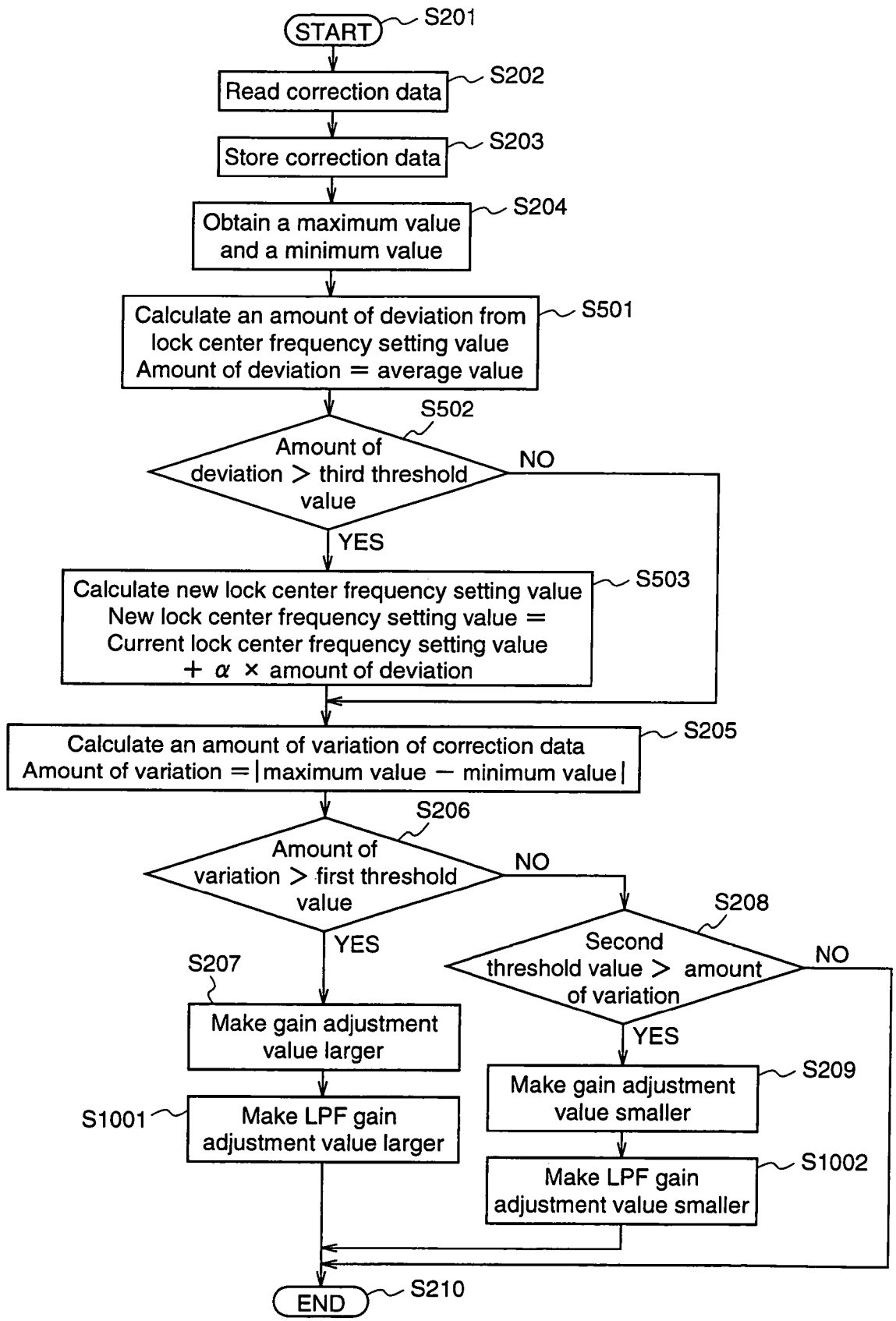
FIG. 10 is a flow chart illustrating a method for setting a gain adjustment value in the synchronous clock generation apparatus according to the fifth embodiment of the present invention.

FIG. 10 is a flow chart for explaining processing for setting a gain adjustment value, a lock center frequency setting value, and LPF gain adjustment data, which is performed by the controller 907 in the synchronous clock generation apparatus according to the fifth embodiment. In FIG. 10, the same reference numerals as those shown in FIG. 8 denotes the same or corresponding processing steps.

Hereinafter, the processing for setting the gain adjustment value, the lock center frequency setting value, and the LPF gain adjustment data, which is performed by the controller 907 in the synchronous clock generation apparatus, will be described with reference to FIG. 10.

In step S201, the vertical synchronizing pulse signal S119 is received as an interrupt signal to start the processing for setting the gain adjustment value and the processing for setting the lock center frequency. In step S202, the controller 907 captures the correction data S906 from the gain variable digital LPF 906. In step S203, the captured correction data S906 is sequentially stored in the storage unit 120 such that only a predetermined number of correction data S906 counting from the latest correction data are stored in the storage unit 120.

In step S204, a maximum value and a minimum value of the correction data S906 stored in the storage unit 120 are obtained. In step S501, an average value of the correction data S906 stored in the storage unit 120 is calculated as an amount of deviation of the correction data S906 from the current lock center frequency setting value. Here, the amount of deviation is 0 or a value with a plus sign or minus sign.

Next, in step S502, the amount of deviation calculated in step S501 is compared with the third threshold value which is described in the second embodiment.

When the amount of deviation is larger than the third threshold value, a value which is obtained by multiplying the amount of deviation by the coefficient α, which is described in the second embodiment, is added to the current lock center frequency setting value, thereby calculating a new lock center frequency setting value, in step S503. Then, the lock center frequency setting data S407 for setting the new lock center frequency setting value is outputted to the adder 109.

The processing of step S503 is performed, or in a case where it is judged in step S502 that the amount of deviation is equal to or smaller than the third threshold value, the minimum value obtained in step S204 is subtracted from the maximum value obtained in step S204 and an absolute value of the calculated value is obtained, thereby calculating the amount of variation of the correction data S906, in step S205. In step S206, the amount of variation calculated in step S205 is compared with the first threshold value which is described in the first embodiment and it is judged whether the amount of variation is larger than the first threshold value or not.

When it is judged in step S206 that the amount of variation is larger than the first threshold value, the processing for making the gain adjustment value larger is performed in step S207. Further, in step S1001, the LPF gain adjustment value is made larger so that the gain which is supplied to the high frequency component of the gain adjustment digital LPF 906 is made larger. Then, the LPF gain adjustment data S907 for setting the gain adjustment value is outputted. As described above, the gain adjustment value of the gain adjustment circuit 108 is made larger in step S207 and, in addition, the LPF gain adjustment value of the gain variable digital LPF 906 is made larger, thereby improving the response speed in stabilizing the horizontal synchronous clock.

When it is judged in step S206 that the amount of variation is equal to or smaller than the first threshold value, the amount of variation is compared with the second threshold value, which is described in the first embodiment in step S208. When it is judged in step S208 that the amount of variation is smaller than the second threshold value, the processing for making the gain adjustment value smaller is performed in step S209. Further, in step S1002, the LPF gain adjustment value is made smaller so that the gain, which is supplied to the high frequency component of the gain adjustment digital LPF 906, is made smaller. Then, the LPF gain adjustment data S907 for setting the gain adjustment value is outputted. As described above, the gain adjustment value of the gain adjustment circuit 108 is made smaller in step S209, and, in addition, the LPF gain adjustment value of the gain variable digital LPF 906 is made smaller, thereby improving the stability of the horizontal synchronous clock and jitter performance of the generated clock.

The processing of step S1001 or S1002 is performed, or in a case where it is judged in step S208 that the amount of variation is larger than the second threshold value, the processing for maintaining the current gain adjustment value is performed, and the processing is completed in step S210.

As described above, the synchronous clock generation apparatus according to the fifth embodiment is identical in construction to the synchronous clock generation apparatus according to the third embodiment shown in FIG. 7 except that the gain variable digital LPF 906 replaces the digital LPF, and the gain adjustment for the high frequency component of the gain variable digital LPF 906 is performed on the basis of the correction data S906. That is, according to the fifth embodiment, every time the vertical synchronizing signal is input according to the input signal, the controller calculates the amount of variation and the amount of deviation on the basis of the correction data, and determines the gain adjustment data, lock center frequency setting data, and LPF gain adjustment data from the result. The gain adjustment circuit performs gain adjustment on the basis of the gain adjustment data, the adder performs addition on the basis of the lock center frequency setting data, and the gain variable digital LPF eliminates high frequency components through the LPF on the basis of the LPF gain adjustment data. Therefore, the synchronous clock generation apparatus is adapted so as to improve the clock precision in generating the horizontal synchronous clock when the input signal is stable and reduce the lock precision in generating the horizontal synchronous clock when the input signal is unstable. Thereby the lock response is improved, without expanding bits in the circuit configuration, and further the lock range can be enlarged by making the input signal trace the horizontal synchronous clock for generating the lock range of the horizontal synchronous clock generated by the synchronous clock generation apparatus, and both the gain adjustment data and the lock center frequency setting data can be controlled, thereby reducing the fluctuation in horizontal synchronous clock which is temporarily generated when changing the lock center frequency setting data by adjusting the gain adjustment data. Further, the gain variable digital LPF can change an LPF gain as well as the controller outputs the gain adjustment data and the lock center frequency setting data, thereby achieving the improvement of lock response speed of the synchronous clock generation apparatus, the improvement of stability of the generated horizontal synchronous clock, and further the improvement of jitter performance of the generated horizontal synchronous clock.

Then, while the fifth embodiment is constructed such that the gain variable digital LPF is used instead of the digital LPF and is controlled by the controller on the basis of the amount of variation of the correction data in the synchronous clock generation apparatus according to the third embodiment, the gain variable digital LPF may be used instead of the digital LPF, and may be controlled by the controller on the basis of the amount of variation of the correction data in the synchronous clock generation apparatus according to the first, second, or fourth embodiment of the present invention. Also in this case, the same effect can be achieved.

Embodiment 6

In a synchronous clock generation apparatus according to a sixth embodiment, a controller in the synchronous clock generation apparatus according to the fifth embodiment is replaced by a controller which is composed of a plurality of circuits and performs the same processing.

Figure 11:
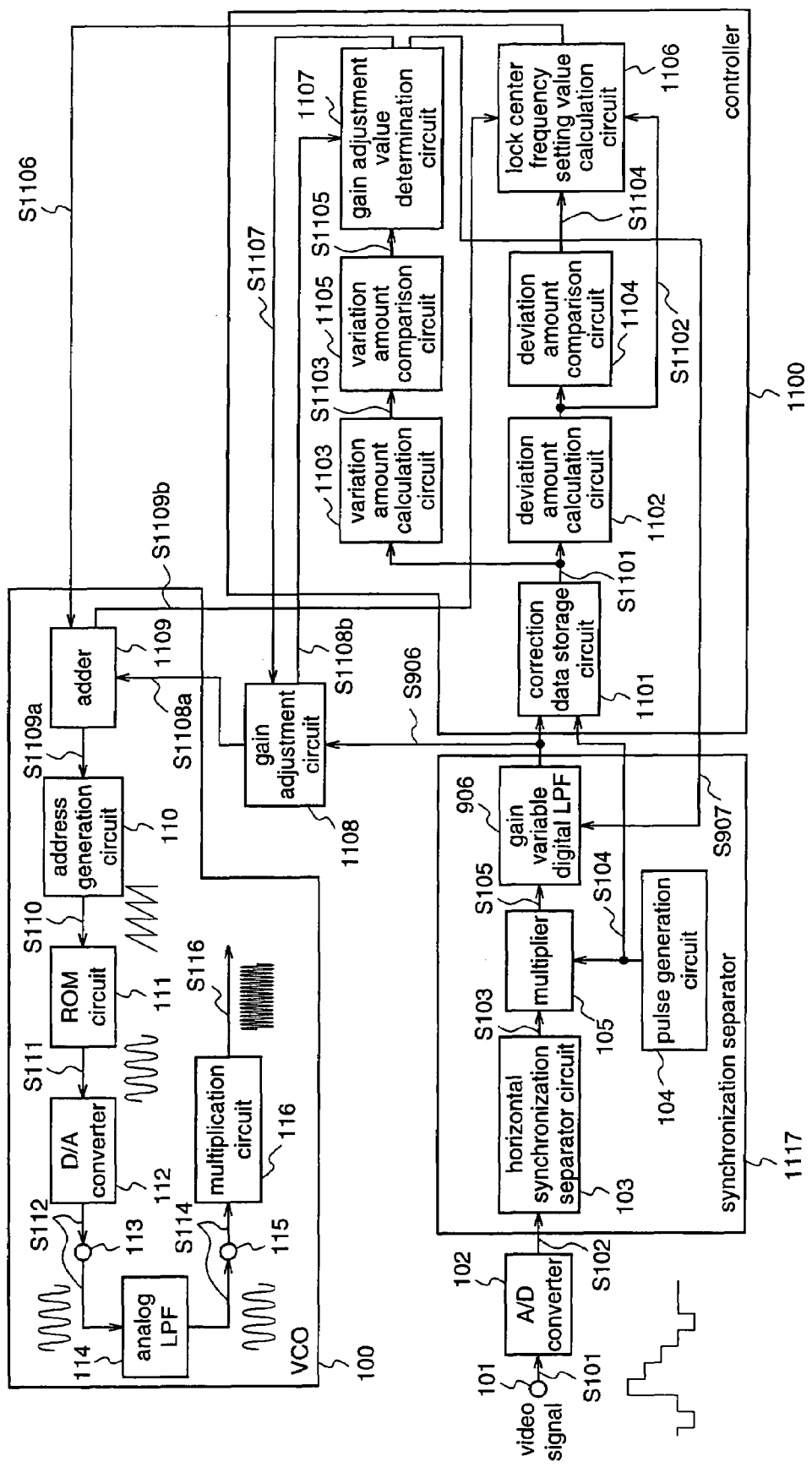
FIG. 11 is a block diagram illustrating a construction of a synchronous clock generation apparatus according to a sixth embodiment of the present invention.
Figure 12:
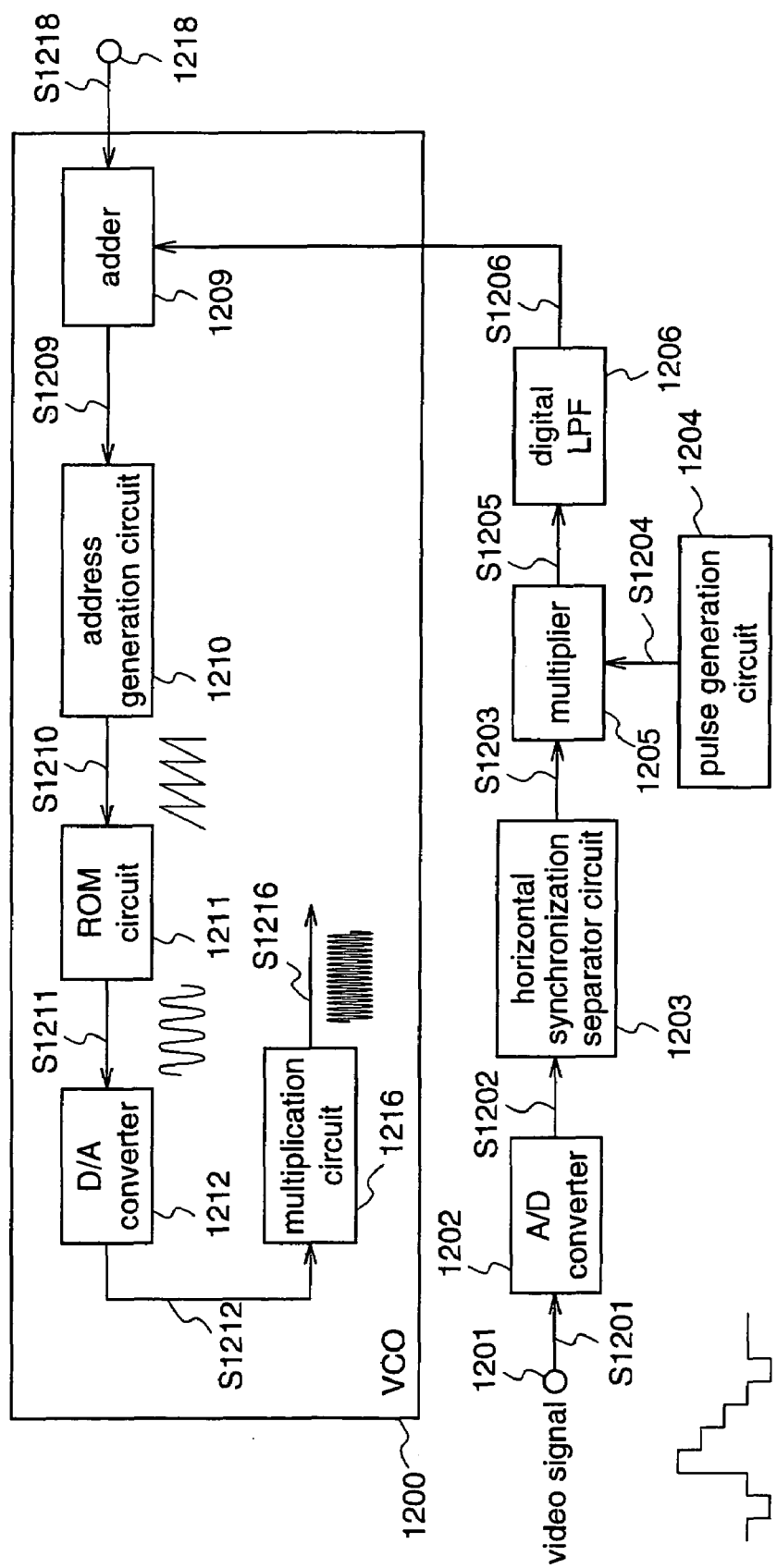
FIG. 12 is a block diagram illustrating a construction of a prior art sampling clock generation circuit.
Figure 13:
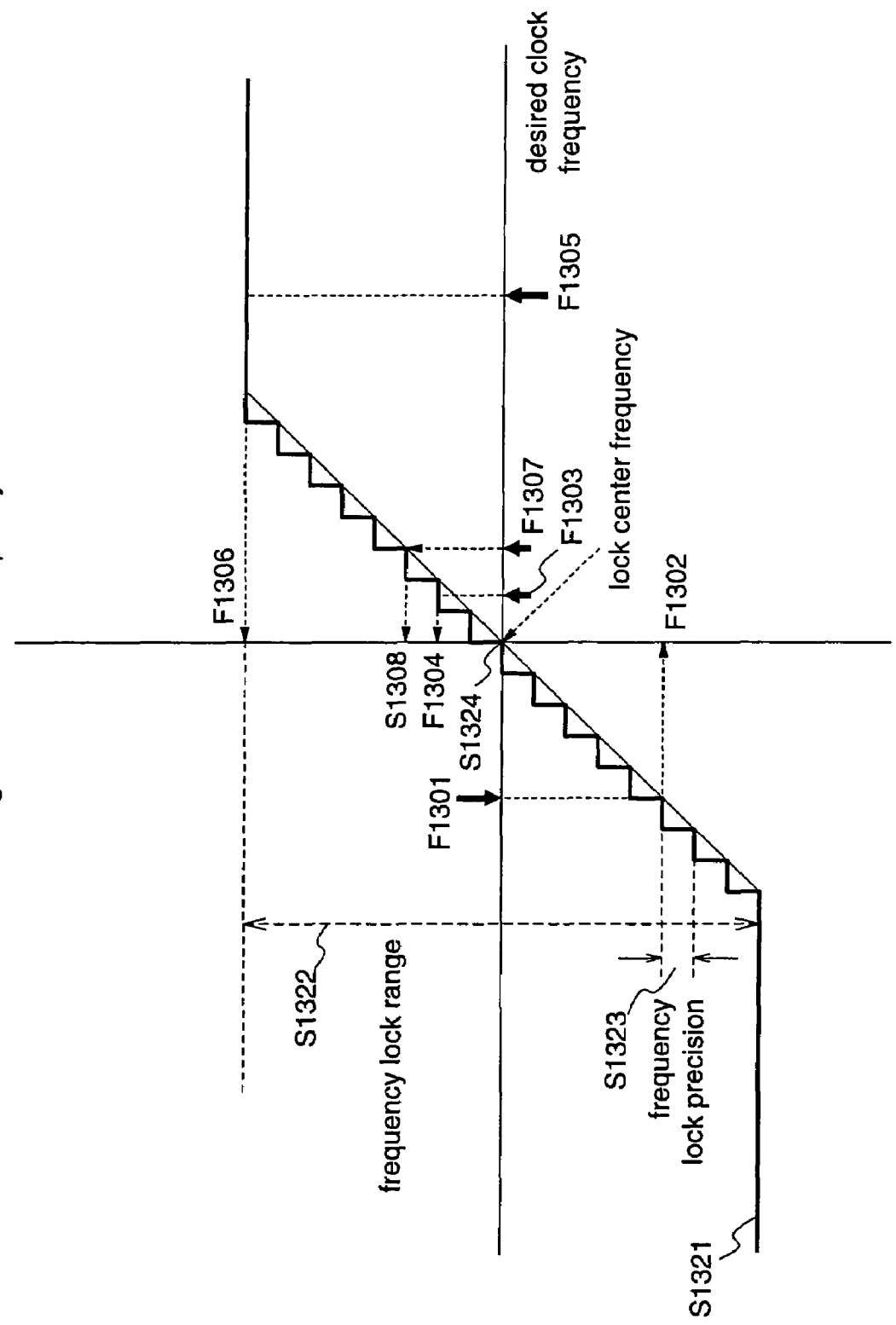
FIG. 13 is a diagram for explaining a performance of the prior art sampling clock generation circuit.

FIG. 11 is a block diagram illustrating a construction of the synchronous clock generation apparatus according to the sixth embodiment of the present invention. In FIG. 11, the same reference numerals as those shown in FIG. 9 denote the same or corresponding parts.

The controller 1100 comprises a correction data storage circuit 1101, a deviation amount calculation circuit 1102, a variation amount calculation circuit 1103, a deviation amount comparison circuit 1104, a variation amount comparison circuit 1105, a lock center frequency setting value calculation circuit 1106, and a gain adjustment value determination circuit 1107.

The correction data storage circuit 1101 receives the correction data S906, which is gain-adjusted by the gain variable digital LPF 906, receives a horizontal synchronizing pulse signal S104 as a load pulse, stores the correction data by the number which is predetermined by a hardware, and outputs the stored correction data S1101. The deviation amount calculation circuit 1102 calculates an average value of the input correction data S1101 as an amount of deviation of the correction data from the lock center frequency setting value, and outputs the deviation amount calculation data S1102 indicating an amount of deviation. The deviation amount comparison circuit 1104 holds the third threshold value which is described in the fifth embodiment, compares the deviation amount calculation data S1102 with the third threshold value, and outputs a deviation amount comparison result data S1104 indicating the comparison result.

The variation amount calculation circuit 1103 obtains a maximum value and a minimum value of the input correction data S1101 and calculates an amount of variation by obtaining the difference between the maximum value and the minimum value, thereby outputting variation amount calculation data S1103. The variation amount comparison circuit 1105 holds the first and second threshold values which are described in the fifth embodiment, compares the variation amount calculation data S1103 with the first and second threshold values, and outputs variation amount comparison result data S1105 indicating the comparison result.

The lock center frequency setting value calculation circuit 1106 receives the deviation amount calculation data S1102, the deviation amount comparison result data S1104, and the current lock center frequency setting data S1109b, performs arithmetic processing, and outputs lock center frequency setting data S1106. To be specific, when the deviation amount comparison result data S1104 indicates that the deviation amount calculation data S1102 is larger than the third threshold value, a value which is obtained by multiplying the deviation amount calculation data S1102 by the coefficient α, which is described in the second embodiment, is added to the current lock center frequency setting data S1109b, thereby obtaining a new lock center frequency setting value, and the lock center frequency setting data S1106 for setting the new lock center frequency setting value is outputted to the adder 1109. Further, when the deviation amount comparison result data S1104 indicates that the deviation amount calculation data S1102 is equal to or smaller than the third threshold value, the current lock center frequency setting data S1109b is maintained.

The gain adjustment value determination circuit 1107 receives the currently set gain adjustment data S1108b and the variation amount comparison result data S1105, performs arithmetic processing, and outputs gain adjustment data S1107 and LPF gain adjustment data S907. To be specific, when the variation amount comparison result data S1105 indicates a judgment result that the amount of variation is larger than the first threshold value, the processing for making the gain adjustment value larger is performed, thereby to output gain adjustment data S1107 according to the gain adjustment value. Further, the processing for making the LPF gain adjustment value larger is performed, thereby to output LPF gain adjustment data S907 according to the LPF gain adjustment value. Moreover, when the variation amount comparison result data S1105 indicates a judgment result that the amount of variation is equal to or smaller than the first threshold value and indicates a judgment result that the amount of variation is smaller than the second threshold value, the processing for making the gain adjustment value smaller and the processing for making the LPF gain adjustment value smaller are performed, thereby to output the gain adjustment data S1107 and the LPF gain adjustment data S907 according to the gain adjustment value and the LPF gain adjustment value, respectively. Further, when the variation amount comparison result data S1105 indicates a judgment result that the amount of variation is equal to or smaller than the first threshold value and indicates a judgment result that the amount of variation is equal to or larger than the second threshold value, the gain adjustment value and the LPF gain adjustment value are maintained as the current values.

The gain adjustment circuit 1108 receives the correction data S906, which is gain-adjusted by the gain variable digital LPF 906, and the gain adjustment data S1107, performs gain adjustment on the correction data S906 on the basis of the gain adjustment data S1107, and outputs the gain-adjusted correction data S1108a to the adder 1109. Further, the gain adjustment circuit 1108 outputs the currently set gain adjustment data S1108b to the gain adjustment value determination circuit 1107.

The adder 1109 receives the gain-adjusted correction data S1108a, and the lock center frequency setting data S1106 outputted from the lock center frequency setting value calculation circuit 1106, and outputs addition data S1109a, which is obtained by adding the two data, to the address generation circuit 110. Further, the adder 1109 outputs the lock center frequency setting data S1109b which is currently used, to the lock center frequency setting value calculation circuit 1106.

The synchronization separator 1117 is identical to the synchronization separator in the synchronous clock generation apparatus according to the fifth embodiment except that the output from the pulse generation circuit 104 is supplied to the correction data storage circuit 1101.

As described above, according to the sixth embodiment, the controller 1100 sets the lock center frequency setting value according to the amount of deviation of the correction data S906, sets the gain adjustment value according to the amount of variation of the correction data S906, and sets the LPF gain adjustment value according to the amount of variation of the correction data S906, thereby achieving the same effect as described in the fifth embodiment. The controller 1100 is composed of a plurality of circuits each of which is not a CPU but performs specific processing, and thereby the synchronous clock generation apparatus can be adapted to a system which does not include a controller composed of operating processing units such as a CPU. Further, at that time, since a controller is not required, the gain adjustment data and the lock center frequency setting data can be calculated and set for each horizontal synchronizing signal without depending on the performance of the controller, thereby improving the tracking performance in generating horizontal synchronous clock.

That is, the processing for calculating and setting the lock center frequency setting value, gain adjustment value, and LPF gain adjustment value, which are performed for each vertical synchronizing signal outputted from the vertical synchronization separator circuit according to the fifth embodiment, can be performed for each horizontal synchronizing signal according to the sixth embodiment, thereby improving the tracking performance in generating the horizontal synchronous clock.

Further, in other words, according to the sixth embodiment, every time the horizontal synchronizing signal is input according to the input signal, the amount of variation and the amount of deviation are calculated on the basis of the correction data, and from the result, the gain adjustment data, lock center frequency setting data, and LPF gain adjustment data are determined. Then, the gain adjustment circuit performs gain adjustment on the basis of the gain adjustment data, the adder performs addition on the basis of the lock center frequency setting data, and the gain variable digital LPF eliminates high frequency component through the LPF on the basis of the LPF gain adjustment data. Thereby, the synchronous clock generation apparatus is adapted so as to improve the clock precision in generating horizontal synchronous clock when the input signal is stable and reduce the lock precision in generating horizontal synchronous clock when the input signal is unstable, and thereby the lock response is improved. Further, the lock range can be enlarged by making the input signal track the horizontal synchronous clock for generating the lock range of the horizontal synchronous clock generated by the synchronous clock generation apparatus. Further, both the gain adjustment data and the lock center frequency setting data can be controlled, thereby reducing the fluctuation in the horizontal synchronous clock which is temporarily generated when changing the lock center frequency setting data by adjusting gain adjustment data. Further, the gain variable digital LPF can change an LPF gain as well as the controller supplies the gain adjustment data and the lock center frequency setting data, thereby enabling the lock response speed of the horizontal synchronous clock apparatus to be improved, and the generated horizontal synchronous clock to be stabilized. Further, the processing is performed in units of a horizontal synchronizing signal, thereby enabling the tracking performance with respect to the input signal to be further improved.

Then, in the present invention, a part of or the whole controller which is described in the sixth embodiment, may be applied to the controllers in the synchronous clock generation apparatus according to the first to fourth embodiments. For example, instead of the controller in the synchronous clock generation apparatus according to the first embodiment, a controller comprising the correction data storage circuit, variation amount calculation circuit, variation amount comparison circuit, and gain adjustment value determination circuit, which are described in the sixth embodiment, may be used. Further, instead of the controller in the synchronous clock generation apparatus according to the second embodiment, a controller comprising the correction data storage circuit, deviation amount calculation circuit, deviation amount comparison circuit, and lock center frequency setting value calculation circuit, which are described in the sixth embodiment, may be used.

Moreover, while in each of the embodiments, a case where a horizontal synchronous clock is generated from a video signal, to which a horizontal synchronizing signal is added, is described, the present invention is applicable for a case where a synchronous clock synchronized with another signal to which a synchronizing signal is added, is generated. Also in this case, the same effects as those described in the respective embodiments can be achieved.

Further, while in each of the embodiments, the present invention is described as a synchronous clock generation apparatus, the present invention may be a synchronous clock generation method which is executed by steps corresponding to the respective functions of the A/D converter, synchronizing signal separator circuit, pulse generation circuit, multiplier, low pass filter, controller, voltage-controlled oscillator.

In this case, the steps which correspond to the functions of from the A/D converter to the voltage-controlled oscillator described above, respectively, can be realized by software, and thereby the same effects as described in the respective embodiments can be achieved.

The synchronous clock generation apparatus and synchronous clock generation method according to the present invention are applicable to a system performing such as video signal processing requiring a horizontal synchronous clock synchronized with a horizontal synchronizing signal, and specifically the apparatus and method are useful for a system performing such as video signal processing for generating a horizontal synchronous clock in digital processing.

What is claimed is:

1. A synchronous clock generation apparatus comprising:
an A/D converter for converting an analog input signal, to which a synchronizing signal is added, into a digital signal using a synchronous clock, synchronized with the synchronizing signal, as a reference of sampling;
a synchronizing signal separator circuit for separating the synchronizing signal from the digital signal;
a pulse generation circuit for counting synchronous clocks up to a number which is previously set for the analog input signal to generate a synchronizing pulse signal;
a multiplier for multiplying the synchronizing signal separated by the synchronizing signal separator circuit by the synchronizing pulse signal and outputting multiplication data;
a low-pass filter for extracting a direct current component from the multiplication data and outputting the direct current component as correction data;
a controller for setting a gain adjustment value, for gain adjustment which is performed on the correction data, based on the correction data, and outputting gain adjustment data indicating the gain adjustment value;
a gain adjustment circuit for performing gain adjustment on the correction data based on the gain adjustment data and for outputting gain-adjusted correction data; and
a voltage-controlled oscillator for generating a clock of a frequency according to the gain-adjusted correction data which is output from the gain adjustment circuit and outputting the clock as the synchronous clock,
wherein the controller:
captures the correction data output from the low-pass filter and stores a predetermined number of correction data counting from a latest correction data from among the captured correction data;

subtracts a minimum value of the stored correction data from a maximum value of the stored correction data to calculate an amount of variation; and compares the amount of variation with a predetermined first threshold value and with a second threshold value smaller than the first threshold value, sets the gain adjustment value to a value larger than a current gain adjustment value when the amount of variation is larger than the first threshold value, and sets the gain adjustment value to a value smaller than the current gain adjustment value when the amount of variation is smaller than the second threshold value, without changing the gain adjustment value when the amount of variation is equal to or smaller than the first threshold value and is equal to or larger than the second threshold value.

2. A synchronous clock generation apparatus comprising:

an A/D converter for converting an analog input signal, to which a synchronizing signal is added, into a digital signal using a synchronous clock, synchronized with the synchronizing signal, as a reference of sampling;

a synchronizing signal separator circuit for separating the synchronizing signal from the digital signal;

a pulse generation circuit for counting synchronous clocks up to a number which is previously set for the analog input signal to generate a synchronizing pulse signal;

a multiplier for multiplying the synchronizing signal separated by the synchronizing signal separator circuit by the synchronizing pulse signal and outputting multiplication data;

a low-pass filter for extracting a direct current component from the multiplication data and outputting the direct current component as correction data;

a controller for setting a gain adjustment value, for gain adjustment which is performed on the correction data, based on the correction data, and outputting gain adjustment data indicating the gain adjustment value;

a gain adjustment circuit for performing gain adjustment on the correction data based on the gain adjustment data and for outputting gain-adjusted correction data; and a voltage-controlled oscillator for generating a clock of a frequency according to the gain-adjusted correction data which is output from the gain adjustment circuit and outputting the clock as the synchronous clock, wherein the controller sets a lock center frequency setting value for setting a frequency of the synchronous clock which is obtained in a state where the correction data is not output from the low-pass filter, the lock center frequency setting value being set based on the correction data, and outputs lock center frequency setting data indicating the lock center frequency setting value, and wherein the voltage-controlled oscillator generates a clock of a frequency according to data obtained by adding the gain-adjusted correction data output from the gain adjustment circuit and the lock center frequency setting data.

3. The synchronous clock generation apparatus as defined in claim 2, wherein the controller:

captures the correction data output from the low-pass filter and stores a predetermined number of correction data counting from a latest correction data from among the captured correction data;

calculates an average value of the stored correction data to calculate an amount of deviation, of the correction data, from the lock center frequency setting value;

compares the amount of deviation with a predetermined third threshold value, and sets the lock center frequency setting value to a value corrected according to the amount of deviation when the amount of deviation is larger than the third threshold value, without changing the lock center frequency setting value when the amount of deviation is equal to or smaller than the third threshold value;

subtracts a minimum value of the stored correction data from a maximum value of the stored correction data to calculate an amount of variation; and compares the amount of variation with a predetermined first threshold value and with a second threshold value smaller than the first threshold value, sets the gain adjustment value to a value larger than a current gain adjustment value when the amount of variation is larger than the first threshold value, and sets the gain adjustment value to a value smaller than the current gain adjustment value when the amount of variation is equal to or smaller than the first threshold value and is smaller than the second threshold value, without changing the gain adjustment value when the amount of variation is equal to or smaller than the first threshold value and is equal to or larger than the second threshold value.

4. The synchronous clock generation apparatus as defined in claim 2, wherein the controller:

captures the correction data output from the low-pass filter and stores a predetermined number of correction data counting from a latest correction data from among the captured correction data;

subtracts a minimum value of the stored correction data from a maximum value of the stored correction data to calculate an amount of variation;

calculates an average value of the stored correction data to calculate an amount of deviation of the correction data from the lock center frequency setting value;

compares the amount of variation with a predetermined first threshold value, and judges whether the current gain adjustment value is a first gain adjustment value or a second gain adjustment value smaller than the first gain adjustment value when the amount of variation is equal to or smaller than the first threshold value as a result of the comparison;

compares the amount of variation with a predetermined second threshold value smaller than the first threshold value when it is judged, as a result of the judgment, that the current gain adjustment value is the first gain adjustment value, and sets the lock center frequency setting value to a value corrected according to the amount of deviation and sets the gain adjustment value to the second gain adjustment value, when the amount of variation is smaller than the second threshold value, without changing the gain adjustment value and the lock center frequency setting value when the amount of variation is equal to or smaller than the second threshold value;

compares the amount of deviation with a predetermined third threshold value when it is judged that the current gain adjustment value is the second gain adjustment value as a result of the judgment of the current gain adjustment value, and sets the gain adjustment value to the first gain adjustment value and sets the lock center frequency setting value to an initial value which is set according to the analog input signal, when it is judged that the amount of variation is larger than the third threshold value, without changing the gain adjustment value and the lock center frequency setting value when it is judged that the amount of deviation is equal to or smaller than the third threshold value; and sets the gain adjustment value to the first gain adjustment value and sets the lock center frequency setting value to an initial value which is set according to the analog input signal when it is judged that the amount of variation is larger than the first threshold value as a result of the comparison as to the amount of variation.

5. A synchronous clock generation apparatus comprising:

an A/D converter for converting an analog input signal, to which a synchronizing signal is added, into a digital signal using a synchronous clock, synchronized with the synchronizing signal, as a reference of sampling;

a synchronizing signal separator circuit for separating the synchronizing signal from the digital signal;

a pulse generation circuit for counting synchronous clocks up to a number which is previously set for the analog input signal to generate a synchronizing pulse signal;

a multiplier for multiplying the synchronizing signal separated by the synchronizing signal separator circuit by the synchronizing pulse signal and outputting multiplication data;

a low-pass filter for extracting a direct current component from the multiplication data and outputting the direct current component as correction data;

a controller for setting a gain adjustment value, for gain adjustment which is performed on the correction data, based on the correction data, and outputting gain adjustment data indicating the gain adjustment value;

a gain adjustment circuit for performing gain adjustment on the correction data based on the gain adjustment data and for outputting gain-adjusted correction data; and a voltage-controlled oscillator for generating a clock of a frequency according to the gain-adjusted correction data which is output from the gain adjustment circuit and outputting the clock as the synchronous clock, wherein the low-pass filter performs gain adjustment for a high frequency component, and wherein the controller sets low-pass filter gain adjustment data for controlling a low-pass filter gain adjustment value for the high frequency component of the low-pass filter based on the correction data output from the low-pass filter and outputs the low-pass filter gain adjustment data to the gain adjustment circuit.

6. The synchronous clock generation apparatus as defined in claim 5, wherein the controller:

captures the correction data output from the low-pass filter and stores a predetermined number of correction data counting from a latest correction data from among the captured correction data;

subtracts a minimum value of the stored correction data from a maximum value of the stored correction data to calculate an amount of variation; and compares the amount of variation with a predetermined first threshold value and with a second threshold value smaller than the first threshold value, sets the low-pass filter gain adjustment value to a value larger than a current gain adjustment value when the amount of variation is larger than the first threshold value, and sets the low-pass filter gain adjustment value to a value smaller than the current gain adjustment value when the amount of variation is smaller than the second threshold value, without changing the low-pass filter gain adjustment value when the amount of variation is equal to or smaller than the first threshold value and is equal to or larger than the second threshold value.

7. A synchronous clock generation apparatus comprising:

an A/D converter for converting an analog input signal, to which a horizontal synchronizing signal is added, into a digital signal using a synchronous clock, synchronized with the horizontal synchronizing signal, as a reference of sampling;

a synchronizing signal separator circuit for separating the horizontal synchronizing signal from the digital signal;

a pulse generation circuit for counting synchronous clocks up to a number which is previously set for the analog input signal to generate a synchronizing pulse signal;

a multiplier for multiplying the horizontal synchronizing signal separated by the synchronizing signal separator circuit by the synchronizing pulse signal and outputting multiplication data;

a low-pass filter for extracting a direct current component from the multiplication data and outputting the direct current component as correction data;

a controller for setting a lock center frequency setting value for setting a frequency of the synchronous clock which is obtained in a state where the correction data is not output from the low-pass filter, the lock center frequency setting value being set based on the correction data, and for outputting lock center frequency setting data indicating the lock center frequency setting value; and a voltage-controlled oscillator for generating a clock of a frequency according to data obtained by adding the correction data and the lock center frequency setting data and outputting the clock as the synchronous clock.

8. The synchronous clock generation apparatus as defined in claim 7, wherein the controller:

captures the correction data output from the low-pass filter and stores a predetermined number of correction data counting from a latest correction data from among the captured correction data;

calculates an average value of the stored correction data to calculate an amount of deviation of the correction data from the lock center frequency setting value; and compares the amount of deviation with a predetermined threshold value, and sets the lock center frequency setting value to a value corrected according to the amount of deviation when the amount of deviation is larger than the predetermined threshold value, without changing the lock center frequency setting value when the amount of deviation is equal to or smaller than the predetermined threshold value.

9. The synchronous clock generation apparatus as defined in claim 7, wherein the low-pass filter performs gain adjustment for a high frequency component, and wherein the controller sets low-pass filter gain adjustment data for controlling a low-pass filter gain adjustment value for the high frequency component of the low-pass filter based on the correction data output from the low-pass filter and outputs the low-pass filter gain adjustment data to a gain adjustment circuit.

10. The synchronous clock generation apparatus as defined in claim 9, wherein the controller:

captures the correction data output from the low-pass filter and stores a predetermined number of correction data counting from a latest correction data from among the captured correction data;

subtracts a minimum value of the stored correction data from a maximum value of the stored correction data to calculate an amount of variation; and compares the amount of variation with a predetermined first threshold value and with a second threshold value smaller than the predetermined first threshold value, and sets the low-pass filter gain adjustment value to a value larger than a current low-pass filter gain adjustment value when the amount of variation is larger than the predetermined first threshold value, and sets the low-pass filter gain adjustment value to a value smaller than the current low-pass filter gain value when the amount of variation is smaller than the second threshold value, without changing the low-pass filter gain adjustment value when the amount of variation is equal to or smaller than the predetermined first threshold value and is equal to or larger than the second threshold value.

11. The synchronous clock generation apparatus as defined in claim 7, wherein the voltage-controlled oscillator comprises:

an adder for generating addition data obtained by adding gain-adjusted correction data and the lock center frequency setting data;

an address generation circuit for performing accumulation arithmetic of the addition data and generating address data whose frequency becomes higher as the addition data becomes larger and whose frequency becomes lower as the addition data becomes smaller based on an accumulated value;

a memory circuit for referring to SIN wave data which is stored therein for each address and generating a digital SIN wave signal according to the address data;

a D/A converter for converting the digital SIN wave signal into an analog SIN wave signal;

an analog low-pass filter for eliminating digital noise of the analog SIN wave signal; and a multiplication circuit for performing an integral multiplication of a frequency of the analog SIN wave signal from which the digital noise is eliminated, to generate the synchronous clock.

12. The synchronous clock generation apparatus as defined in claim 7, wherein the analog input signal is a video signal.

13. The synchronous clock generation apparatus as defined in claim 12, wherein a vertical synchronizing signal is added to the video signal, wherein the synchronous clock generation apparatus further includes a vertical synchronizing signal separator circuit for separating the vertical synchronizing signal from the digital signal which is converted by the A/D converter, and wherein the controller uses the vertical synchronizing signal as a start signal for processing.

14. A synchronous clock generation apparatus comprising:

an A/D converter for converting an analog input signal, to which a horizontal synchronizing signal is added, into a digital signal using a synchronous clock, synchronized with the horizontal synchronizing signal, as a reference of sampling;

a synchronizing signal separator circuit for separating the horizontal synchronizing signal from the digital signal;

a pulse generation circuit for counting synchronous clocks up to a number which is previously set for the analog input signal to generate a synchronizing pulse signal;

a multiplier for multiplying the horizontal synchronizing signal separated by the synchronizing signal separator circuit by the synchronizing pulse signal and outputting multiplication data;

a low-pass filter for extracting a direct current component from the multiplication data and outputting the direct current component as correction data;

a gain adjustment circuit for performing gain adjustment on the correction data based on gain adjustment data and outputting gain-adjusted correction data;

a voltage-controlled oscillator for generating a clock of a frequency according to data obtained by adding the gain-adjusted correction data obtained from the gain adjustment circuit and lock center frequency setting data for setting a lock center frequency setting value for setting a frequency of the synchronous clock obtained in a state where the correction data is not output from the low-pass filter, to generate a clock synchronized with the horizontal synchronizing signal and outputting the clock as the synchronous clock;

a correction data storage circuit for receiving the synchronizing pulse signal as a load pulse, capturing the correction data output from the low-pass filter, and storing a predetermined number of correction data counting from a latest correction data from among the captured correction data;

a variation amount calculation circuit for subtracting a minimum value of the correction data stored by the correction data storage circuit from a maximum value of the correction data stored by the correction data storage circuit to calculate an amount of variation;

a variation amount comparison circuit for comparing the amount of variation with a predetermined first threshold value and with a second threshold value smaller than the first threshold value and outputting a variation amount comparison result;

a gain adjustment value determination circuit for setting a gain adjustment value for gain adjustment performed on the correction data based on the variation amount comparison result and outputting data indicating the gain adjustment value as the gain adjustment data;

a deviation amount calculation circuit for calculating an average value of the correction data stored in the correction data storage circuit to calculate an amount of deviation of the correction data from the lock center frequency setting value;

a deviation amount comparison circuit for comparing the amount of deviation with a predetermined third threshold value and outputting a deviation amount comparison result; and a lock center frequency setting value calculation circuit for setting a lock center frequency setting value based on the amount of deviation and the deviation amount comparison result, and outputting data indicating the lock center frequency setting value as the lock center frequency setting data.

15. The synchronous clock generation apparatus as defined in claim 14, wherein the low-pass filter performs gain adjustment for a high frequency component, and wherein the gain adjustment value determination circuit sets low-pass filter gain adjustment data for controlling a low-pass filter gain adjustment value for the high frequency component of the low-pass filter based on the variation amount comparison result and outputs the low-pass filter gain adjustment data to the low-pass filter.

16. A synchronous clock generation method comprising:

converting an analog input signal, to which a horizontal synchronizing signal is added, into a digital signal using a synchronous clock, synchronized with the horizontal synchronizing signal, as a reference of sampling;

separating the horizontal synchronizing signal from the digital signal;

counting synchronous clocks up to a number which is previously set for the analog input signal to generate a synchronizing pulse signal;

multiplying the horizontal synchronizing signal separated from the digital signal by the synchronizing pulse signal and outputting multiplication data;

extracting a direct current component from the multiplication data to generate correction data;

setting a lock center frequency setting value for setting a frequency of the synchronous clock obtained in a state where the correction data is not output, the lock center frequency setting value being set based on the correction data, and outputting lock center frequency setting data indicating the lock center frequency setting value; and generating a clock of a frequency according to data obtained by adding the correction data and the lock center frequency setting data and outputting the clock as the synchronous clock.

* * * * *